United States Patent
O'Brien et al.

(10) Patent No.: US 11,572,313 B2
(45) Date of Patent: *Feb. 7, 2023

(54) CERAMIC SLURRIES WITH PHOTOREACTIVE-PHOTOSTABLE HYBRID BINDERS

(71) Applicant: General Electric Company, Schenectady, NY (US)

(72) Inventors: Michael Joseph O'Brien, Halfmoon, NY (US); Cathleen Ann Hoel, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/802,632

(22) Filed: Feb. 27, 2020

(65) Prior Publication Data

US 2021/0269362 A1    Sep. 2, 2021

(51) Int. Cl.

| | | |
|---|---|---|
| C08F 2/46 | (2006.01) | |
| C08F 2/50 | (2006.01) | |
| C08G 61/04 | (2006.01) | |
| C04B 35/117 | (2006.01) | |
| B33Y 10/00 | (2015.01) | |
| B29C 64/165 | (2017.01) | |
| B33Y 70/10 | (2020.01) | |
| C08F 222/10 | (2006.01) | |
| B28B 1/00 | (2006.01) | |
| B28B 11/24 | (2006.01) | |
| C04B 35/634 | (2006.01) | |
| C04B 35/638 | (2006.01) | |
| C04B 35/64 | (2006.01) | |
| B29K 83/00 | (2006.01) | |
| B29K 509/02 | (2006.01) | |

(52) U.S. Cl.
CPC .......... *C04B 35/117* (2013.01); *B28B 1/001* (2013.01); *B28B 11/243* (2013.01); *B29C 64/165* (2017.08); *B33Y 10/00* (2014.12); *B33Y 70/10* (2020.01); *C04B 35/638* (2013.01); *C04B 35/63444* (2013.01); *C04B 35/64* (2013.01); *C08F 222/102* (2020.02); *B29K 2083/00* (2013.01); *B29K 2509/02* (2013.01); *C04B 2235/3217* (2013.01); *C04B 2235/3418* (2013.01); *C04B 2235/483* (2013.01); *C04B 2235/6026* (2013.01); *C08F 2800/20* (2013.01)

(58) Field of Classification Search
CPC .............. C04B 35/64; C04B 35/6344; C04B 35/63452; C04B 35/6369; C04B 35/63404; C04B 35/638; C04B 35/111; C04B 35/62635; C04B 35/18; C04B 35/117; C04B 35/63424; C04B 2235/3217; C04B 2235/5436; C04B 2235/3418; C04B 2235/6026; C04B 2235/80; C04B 2235/483; C04B 2235/9615; C04B 2235/5472; C08F 222/102; C08F 2800/20; B33Y 70/10; B33Y 10/00; B29K 2509/02; B29K 2083/00; B29C 64/165; B28B 1/001
USPC .................... 522/7, 1, 6, 189, 184; 520/1
See application file for complete search history.

(56) References Cited

U.S. PATENT DOCUMENTS

| | | |
|---|---|---|
| 4,061,652 A | 12/1977 | Schroeter et al. |
| 4,179,548 A | 12/1979 | Schroeter et al. |
| 5,488,017 A | 1/1996 | Szweda et al. |
| 5,496,682 A | 3/1996 | Quadir et al. |
| 5,601,674 A | 2/1997 | Szweda et al. |
| 6,117,612 A | 9/2000 | Halloran et al. |
| 6,294,261 B1 | 9/2001 | Sangeeta et al. |
| 6,638,572 B1 | 10/2003 | Inglefield |
| 6,998,425 B2 | 2/2006 | Chisholm et al. |
| 7,265,161 B2 | 9/2007 | Leatherdale et al. |
| 7,287,573 B2 | 10/2007 | McNulty et al. |
| 7,790,347 B2 | 9/2010 | Leatherdale et al. |
| 7,854,969 B2 | 12/2010 | Millard et al. |
| 7,927,538 B2 | 4/2011 | Moszner et al. |
| 8,106,107 B2 | 1/2012 | Napadensky |
| 8,133,831 B2 | 3/2012 | Laubersheimer et al. |
| 8,475,946 B1 | 7/2013 | Dion et al. |
| 9,527,244 B2 | 12/2016 | El-Siblani |

(Continued)

FOREIGN PATENT DOCUMENTS

| | | | | |
|---|---|---|---|---|
| CN | 105566860 A | | 5/2016 | |
| CN | 106747360 A | * | 5/2017 | ............ B33Y 70/00 |

(Continued)

OTHER PUBLICATIONS

Yang et al, CN 106747360A Machine Translation, May 31, 2017 (Year: 2017).*

(Continued)

*Primary Examiner* — Jessica Whiteley

(74) *Attorney, Agent, or Firm* — Dority & Manning, P.A.

(57) ABSTRACT

Ceramic slurries may include ceramic particles, a photoreactive-photostable hybrid binder, and a photoinitiator. The photoreactive-photostable hybrid binder may include a photoreactive organic resin component, a photoreactive siloxane component, and one or more photostable siloxane components. Methods of forming a ceramic part may include curing a portion of a ceramic slurry by exposing the portion of the ceramic slurry to light to form a green ceramic part, and partially firing the green ceramic part to form a brown ceramic part. The brown ceramic part may be sintered at or above a sintering temperature of the ceramic particles to form a ceramic part, wherein sintering includes heating the brown ceramic part to a sufficient temperature to promote reaction bonding that converts silica from the photoreactive-photostable hybrid binder into silicates that bond with the ceramic particles.

20 Claims, 1 Drawing Sheet

(56) References Cited

U.S. PATENT DOCUMENTS

| | | |
|---|---|---|
| 9,950,358 B2 | 4/2018 | Yang et al. |
| 10,023,500 B2 | 7/2018 | O'Brien et al. |
| 10,093,849 B2 | 10/2018 | Windeband et al. |
| 2004/0132890 A1 | 7/2004 | Oka et al. |
| 2005/0070651 A1 | 3/2005 | McNulty et al. |
| 2005/0252631 A1 | 11/2005 | Bardes et al. |
| 2006/0116476 A1 | 6/2006 | Cheng |
| 2012/0010066 A1 | 1/2012 | Fischer et al. |
| 2015/0328678 A1 | 11/2015 | McNulty et al. |
| 2016/0145449 A1 | 5/2016 | Hilgers |
| 2016/0214165 A1 | 7/2016 | Hoel et al. |
| 2021/0261468 A1 | 8/2021 | Stesikova et al. |
| 2021/0269361 A1* | 9/2021 | O'Brien ............ C04B 35/64 |

FOREIGN PATENT DOCUMENTS

| | | | |
|---|---|---|---|
| CN | 106747360 A | 5/2017 | |
| CN | 107903706 A | 4/2018 | |
| CN | 109748573 A | 5/2019 | |
| CN | 109796853 A | 5/2019 | |
| CN | 110154201 A | 8/2019 | |
| WO | WO2015/068860 A1 | 5/2015 | |
| WO | WO-2020018815 A1 * | 1/2020 | ............ B22C 9/10 |

OTHER PUBLICATIONS

Ma Qingsong et al., "High-temperature evolution behavior of polymer-derived SiAlOC ceramics under inert atmosphere", Journal of Alloys and Compounds, Elsevier Sequoia, Lausanne, CH, vol. 723, Jun. 27, 2017, pp. 17-20.

Greco et al., Stereolitography of Ceramic Suspensions, Journal of Materials Science, Kluwer Academic Publishers, 36, 2001, pp. 99-105.

* cited by examiner

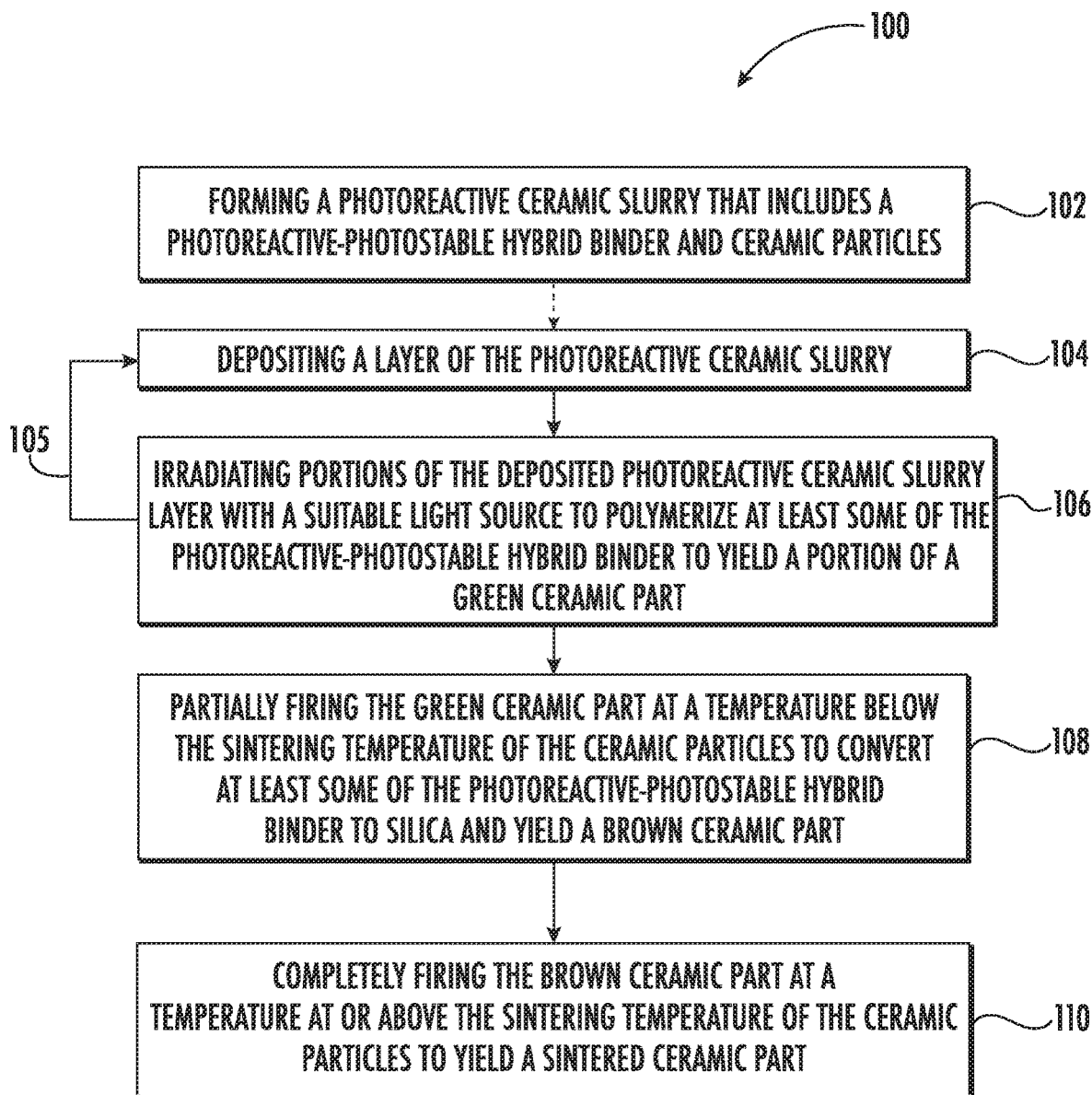

CERAMIC SLURRIES WITH PHOTOREACTIVE-PHOTOSTABLE HYBRID BINDERS

FIELD OF TECHNOLOGY

The present disclosure generally pertains to ceramic slurries and, more particularly, to binders for ceramic slurries. The present disclosure additionally pertains to methods of forming ceramic parts using ceramic slurries.

BACKGROUND

Curable ceramic slurries, such as photoreactive ceramic slurries, can be used to manufacture ceramic parts that, in turn, may serve as molds for producing intricate metallic parts. Curable ceramic slurries generally include one or more curable organic resins, ceramic particles, and additives (e.g., dispersants, photoinitiators, and stabilizers, inhibitors, etc.). Once a curable ceramic slurry has been formed and deposited, a suitable curing source may supply the requisite activation energy to cure (e.g., polymerize) the organic binder, such that the ceramic particles are bound (e.g., adhered, secured) to one another by the polymerized binder, yielding what is referred to as a green (e.g., unfired) ceramic part of the desired shape. Once cured, the green ceramic part may be partially fired (e.g., heated to a temperature less than the sintering temperature of the ceramic particles) to debind the part, which releases organics from the green ceramic part, yielding what is referred to as a brown ceramic part. Subsequently, the brown ceramic part is completely fired (e.g., sintered) such that the ceramic particles fuse to form a sintered ceramic part.

When traditional organic binders are used to form a curable ceramic slurry, the organic binder is completely removed during the partial firing step, resulting in a brown ceramic part that is weak and susceptible to damage. Because the brown ceramic part may require some handling (e.g., transfer to another furnace, inspection, modification) prior to the final firing step, the fragility of the brown ceramic part may limit part yields. As such, it is generally desirable to improve the handling strength of brown ceramic parts in order to improve part yields and, thereby, reduce part cost.

Accordingly, there exists a need for improved curable ceramic slurries, improved binders for curable ceramic slurries, as well as improved methods for forming ceramic slurries and for forming a ceramic part from a ceramic slurry.

BRIEF DESCRIPTION

Aspects and advantages will be set forth in part in the following description, or may be obvious from the description, or may be learned through practicing the presently disclosed subject matter.

In one aspect, the present disclosure embraces photoreactive-photostable hybrid binders An exemplary photoreactive-photostable hybrid binder may include a photoreactive organic resin component, a photoreactive siloxane component, and one or more photostable siloxane components. Another exemplary photoreactive-photostable hybrid binder may include a photoreactive organic resin component, and one or more photostable siloxane components, in which the photostable siloxane component exhibits a char yield of at least 20 wt. %. Exemplary embodiments may include one or more photoreactive siloxane components and one or more photostable siloxane components, or one or more photostable siloxane components without a photoreactive siloxane component.

In another aspect, the present disclosure embraces ceramic slurries. An exemplary ceramic slurry includes ceramic particles, a photoreactive-photostable hybrid binder, and a photoinitiator. In one embodiments, the photoreactive-photostable hybrid binder may include a photoreactive organic resin component, a photoreactive siloxane component, and one or more photostable siloxane components. In another embodiment, the photoreactive-photostable hybrid binder may include a photoreactive organic resin component, and one or more photostable siloxane components, without a photoreactive siloxane component. The one or more photostable siloxane component may each respectively exhibit a char yield of at least 20 wt. %.

In yet another aspect, the present disclosure embraces methods of forming a ceramic part. An exemplary method may include curing a portion of a ceramic slurry by exposing the portion of the ceramic slurry to light to form a green ceramic part, and partially firing the green ceramic part to form a brown ceramic part. In some embodiments, an exemplary method may include forming a ceramic slurry and/or forming a photoreactive-photostable hybrid binder. In some embodiments, an exemplary method may include sintering the brown ceramic part at or above a sintering temperature of the ceramic particles to form a ceramic part. Sintering may include heating the brown ceramic part to a sufficient temperature to promote reaction bonding that converts silica from the photoreactive-photostable hybrid binder into silicates that bond with the ceramic particles.

Some exemplary methods may be performed using a photoreactive-photostable hybrid binder that includes one or more photoreactive organic resin components, one or more photoreactive siloxane components, and one or more photostable siloxane components. Additionally, or in the alternative, some exemplary methods may be performed using a photoreactive-photostable hybrid binder that includes one or more photoreactive organic resin components, and one or more photostable siloxane components, without a photoreactive siloxane component. The one or more photostable siloxane components may each respectively exhibit a char yield of at least 20 wt. %.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 1 shows a flow diagram depicting an exemplary method of manufacturing a ceramic part.

Repeat use of reference characters in the present disclosure and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

It is understood that terms such as "top", "bottom", "outward", "inward", and the like are words of convenience and are not to be construed as limiting terms. For example, it will be appreciated that some ceramic parts are printed "upside-down" such that the "top" portion during printing may correspond to a "bottom" portion of the printed part, and so forth. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. For example, the approximating language may refer to being within a ten percent (10%) margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

I. Overview

Curable ceramic slurries are useful in the manufacture of ceramic parts, and which are particularly useful for stereolithography (e.g., three dimensional (3D) printing) of ceramic parts. A curable ceramic slurry may be curable through a photoreactive pathway and/or a thermally-reactive pathway. By way of example, an exemplary 3D printing application such as stereolithography generally includes sequential layers of a ceramic slurry being applied to a surface and then cured in a layer-by-layer process. The surface may be a platform or stage of the 3D printer or the surface of a previously cured portion of a part being printed. Once the layer has been deposited, it may be selectively irradiated with light having a suitable wavelength (e.g., UV, visible, etc.) to initiate polymerization of the binder and to selectively cure and solidify desired regions of the layer to form (e.g., define) a layer of a green ceramic part. For example, a laser having suitable optical characteristics (e.g., a UV laser) may be scanned over the deposited layer of slurry and selectively activated at different times to cure regions of the layer, based on instruction from a controller, to form the layer of the green ceramic part. In other embodiments, other sources of activation energy may be used (e.g., UV lamp and a photomask). In exemplary embodiments, the deposited layer of slurry may be cured using a digital light processing (DLP) system that utilizes a microelectromechanical mirror array to simultaneously direct beams of light from a light source (e.g., a light emitting diode (LED) lamp) to particular portions of the deposited slurry layer.

Subsequent layers of the slurry are deposited over the previous layer and selectively cured in a layer-by-layer process until the desired structure of the green ceramic part is achieved. The uncured regions of each layer may be rinsed away using an organic solvent. The organic solvent may be applied, for example, between application of sequential layers and/or after the desired structure of the green ceramic part is achieved. The green ceramic part may be partially fired to achieve a brown ceramic part, and then fully fired to achieve the sintered ceramic part. Stereolithography and other 3D printing techniques enable the production of ceramic parts having fine features that are not readily achieved using other manufacturing techniques. Further, the ceramic parts manufactured in this way may themselves be useful as sacrificial molds used in the manufacture of complex metal parts (e.g., components of gas turbine engines, jet engines, rocket engines).

Exemplary ceramic slurry formulations may include ceramic particles and a binder. In accordance with the present disclosure, the binder may be a photoreactive-photostable hybrid binder. As used herein, the term "photoreactive-photostable hybrid binder" refers to a binder that includes a photoreactive organic resin component mixed with a photostable siloxane component. The term "photoreactive-photostable hybrid binder" may sometimes be referred to by the abbreviation "Pr-Ps hybrid binder." Optionally, a Pr-Ps hybrid binder may additionally include a photoreactive siloxane component in addition to the photoreactive organic resin component and the photostable siloxane component. The terms "photoreactive" and "photo reactivity" may be used interchangeably and generally refer to an affinity for light-induced free radical polymerization (e.g., copolymerizing or homopolymerizing) under light-curing conditions. The terms "photostable" and "photostability" may be used interchangeably and generally refer to a low affinity for light-induced free radical polymerization (e.g., copolymerizing or homopolymerizing) under light-curing conditions. Thus, in accordance with the present disclosure, a Pr-Ps hybrid binder may include an organic resin component that has an affinity for light-induced free radical polymerization (e.g., copolymerizing or homopolymerizing) under light-curing conditions, and a siloxane component that has a low affinity for light-induced free radical polymerization (e.g., copolymerizing or homopolymerizing) under light-curing conditions.

An exemplary Pr-Ps hybrid binder may include one or more photoreactive organic resin components, one or more photostable siloxane components, and one or more photoreactive siloxane components. Another exemplary Pr-Ps hybrid binder may include one or more organic resin components, and one or more photostable siloxane components, without including a photoreactive siloxane component. A Pr-Ps hybrid binder may include one or more species of photostable siloxane components. In some embodiments, the photostable siloxane component(s) may be the only siloxane component(s) in the Pr-Ps hybrid binder. Alternatively, in some embodiments a Pr-Ps hybrid binder may include one or more species of photoreactive siloxane components in addition to the one or more species of photostable siloxane components. Exemplary Pr-Ps hybrid binders may additionally include a photoinitiator, such to initiate the photoreactivity of the photoreactive organic resin component and/or a photoreactive siloxane component. For example, a Pr-Ps hybrid binder may include a photoreactive siloxane component, a photostable siloxane component, a photoreactive organic resin component, and a photoinitiator.

Certain features of the presently disclosed Pr-Ps hybrid binders are desirable for the manufacture of ceramic parts. For example, it is presently recognized that it is generally desirable for the siloxane component(s) of the Pr-Ps hybrid binder to be miscible or soluble with the organic resin component(s) of the Pr-Ps hybrid binder prior to curing. Also, it is presently recognized that it is generally desirable for the siloxane component(s) to remain substantially miscible or soluble with the organic resin component(s) until the curing process is substantially complete. Such miscibility or solubility is desirable regardless of whether the siloxane is photoreactive or photostable. However, it is particularly desirable that certain photoreactive siloxanes that exclusively copolymerize with a particular photoreactive organic resin remain substantially miscible or soluble with the photoreactive organic resin until the curing process is substantially complete. As used herein, the term "soluble" may include about 1 gram of solute dissolved in from about 1 to about 100 grams of solvent, such as from about 1 to about 50 grams of solvent or from about 1 to about 30 grams of solvent.

In general, many photoreactive siloxanes are not miscible or soluble with many of the organic monomers (e.g., acrylates, epoxies, vinyl ethers) typically used as organic resins in traditional binders. However, it is presently recognized that, for Pr-Ps hybrid binders that include a photoreactive siloxane component that is capable of homopolymerization when used with a particular photoreactive organic resin, the photoreactive siloxane component may be generally miscible or soluble with the photoreactive organic resin before curing, but may separate into different phases at some point during the curing process. In other words, for photoreactive siloxanes that are capable of homopolymerization when used with a particular photoreactive organic resin, the photoreactive siloxane and the photoreactive organic resin components of the Pr-Ps hybrid binder may independently cure (e.g., in separate phases) resulting in interpenetrating homopolymer networks. However, in some embodiments, a photoreactive siloxane may be capable of both homopolymerization and copolymerization, depending, for example, on the nature of the photoreactive organic resin. By way of illustration, methacrylated photoreactive siloxanes can both homopolymerize and copolymerize with acrylate-based organic resin monomers; however, such a methacrylate silicone resin can homopolymerize but generally does not copolymerize when formulated with an epoxy-based, cationically curable organic resin monomer.

While photostable siloxanes are stable or exhibit low reactivity in respect of polymerization with the photoreactive organic resin component under light-curing conditions, it is presently recognized that it is desirable for the photostable siloxane component to remain with the photocured layer of the green ceramic part and not be extracted by the organic solvent used to remove uncured material between deposition of sequential layers. Surprisingly, it has been found that certain photostable siloxane components are not readily extracted by the organic solvent. Without being bound to any theory, it is believed that certain photoreactive siloxane components and photostable siloxane components may work synergistically to improve reactivity of the photoreactive siloxane components with the photoreactive organic resin component while also providing for additional silica formation during firing. For example, the inclusion of certain photostable siloxane components in the Pr-Ps hybrid binder may allow for certain photoreactive siloxane components to be included at a more advantageous molar ratio relative to the photoreactive organic resin component while at the same time achieving a desired resulting level of silica formation during firing.

Additionally, it has been found that certain photostable siloxane components may be utilized without the presence of a photoreactive siloxane component. While the photostable siloxane component is generally photostable under light-curing conditions, a photostable siloxane component may be utilized in a Pr-Ps hybrid binder without the presence of a photoreactive siloxane component and the photostable siloxane component may remain persistent in the ceramic part without being substantially rinsed away by the organic solvent. In exemplary embodiments, any photostable siloxane component that is miscible or soluble in the Pr-Ps hybrid binder and that exhibits a char yield of at least about 20 wt. % may be utilized without the presence of a photoreactive siloxane component. Generally, in some embodiments, the persistence of a photostable siloxane component in the Pr-Ps hybrid binder may correspond at least in part to the molecular weight of the photostable siloxane component, with higher molecular weights corresponding to greater persistence in the Pr-Ps hybrid binder.

Accordingly, a photostable siloxane component may be selected for its persistence in a Pr-Ps hybrid binder, providing a suitable char yield even though the photostable siloxane component exhibits photostability or low reactivity in respect of light-induced free radical polymerization (e.g., copolymerizing or homopolymerizing) with the photoreactive organic resin component under light-curing conditions. Additionally, or in the alternative, in some embodiments a photostable siloxane component may exhibit thermal reactivity under heat-curing conditions, which thermal reactivity may contribute at least in part to the persistence of a photostable siloxane component in the Pr-Ps hybrid binder in addition to, or as an alternative to, the molecular weight of the photostable siloxane component. However, a photostable siloxane component need not be thermally-reactive in order to exhibit suitable persistence. Rather, the present disclosure embraces embodiments in which a Pr-Ps hybrid binder includes any one or more photostable siloxane components that exhibit suitable persistence in the Pr-Ps hybrid binder without the presence of a photoreactive siloxane component, regardless of whether or not the photostable siloxane component exhibits thermal reactivity. Thus, a Pr-Ps hybrid binder may include one or more photostable siloxane components that exhibit thermal reactivity and/or one or more photostable siloxane components that do not exhibit thermal reactivity, even without the presence of a photostable siloxane component.

Generally, the organic resin component of the Pr-Ps hybrid binder decomposes and volatilizes during partial firing, yet at least some of the siloxane component (the photostable siloxane component and/or the photoreactive siloxane component) is converted to silica that is disposed about the ceramic particles (e.g., between, around the ceramic particles). The presence of silica may enhance the handling strength of the brown ceramic part relative to similar parts that do not contain silica. Advantageously, the amount of silica formed by the presently disclosed Pr-Ps hybrid binders is surprisingly high, enabling char yields that can be greater than about 80%, or more, of the theoretical maximum char yield for a given Pr-Ps hybrid binder. As used herein, the term "char yield" refers to the percentage of weight remaining after firing at 800° C., which is indicative of the amount of silica formed during firing. The char yield may be determined by thermogravimetric analysis (TGA), for example, using a TGA 7 thermogravimetric analyzer.

In exemplary embodiments, the presently disclosed Pr-Ps hybrid binders provide for a substantial portion of the siloxane component(s) in the Pr-Ps hybrid binder to be converted to silica during firing and retained within the brown ceramic part, which significantly improves adhesion between the ceramic particles and thereby increases the strength and yield of the brown ceramic part relative to traditional organic binder formulations. For example, a substantial portion of a combined photostable siloxane component and photoreactive siloxane component present in a Pr-Ps hybrid binder may be converted to silica during firing and retained within the brown ceramic part. In exemplary embodiments, with the presently disclosed Pr-Ps hybrid binders, the proportion of the siloxane component(s) in the Pr-Ps hybrid binder converted to silica and retained in the brown ceramic part may be greater than about 20 wt. %, such as greater than about 30 wt. %, such as greater than about 40 wt. %, such as greater than about 50 wt. %, such as greater than about 60 wt. %, such as greater than about 70 wt. %, or such as greater than about 80 wt. %, or more.

II. Ceramic Particles

Exemplary embodiments may include a mixture of different classes of ceramic particles, such as particles having different particle morphologies and/or different particle size distributions. As used herein, the term "morphology," when used in the context of particle characteristics, refers to the shape of the particle.

The different particle morphologies and/or particle size distributions may encourage tight packing of the ceramic particles. For example, in some embodiments, exemplary ceramic slurry formulations may reduce sintering shrinkage and densification of the ceramic part compared to conventional ceramic slurry formulations. Ceramic parts that are 3D printed using the disclosed ceramic slurry formulations may have desirable densities and porosities after firing (e.g., sintering). Additionally, or in the alternative, a ceramic slurry that includes different particle morphologies may provide slurry viscosities that facilitate 3D printing. For example, with exemplary ceramic slurry formulations, round, sphere-like ceramic particles can more easily slip past each other within a flowing slurry, decreasing slurry viscosity compared to other ceramic slurries having only ceramic particles with substantially uniform low-sphericity morphology. As used herein, the term "sphericity" refers to a ratio of the surface area of a sphere having the same volume as the particle to the surface area of a particle, where a perfectly spherical particle would have a sphericity of 1. A particle having a high sphericity has a morphology similar to the morphology of a spherical particle, and a particle having a low sphericity has a morphology that is less spherical and more angular. That is, the sphericity of a particle refers to how close a shape of a particle is to a perfect sphere.

A ceramic slurry may include ceramic particles that have a multimodal particle morphology, such as a bimodal particle morphology, a trimodal particle morphology, and so forth. For example, a ceramic slurry may include a first fraction of particles that have a first morphology (referred to as a first particle morphology) and a second fraction of particles that have a second morphology (referred to as a second particle morphology), with the first particle morphology having a morphology that differs from the morphology of the second particle morphology. Additionally, or in the alternative, a ceramic slurry may include ceramic particles that have a multimodal size distribution, such as a bimodal size distribution, a trimodal size distribution, and so forth.

Exemplary ceramic slurry formulations may include at least two classes of particle morphologies, such as a bimodal or multimodal particle morphology. In certain embodiments, this difference between particle morphologies of the respective particle pluralities may be characterized by a difference in the degree to which the particles approach perfect sphere shapes; the mathematical quantity, sphericity, may be used in the art to quantify this characteristic. For the purposes of this disclosure, the sphericity of a class of particles refers to the median sphericity measured for a representative sample of the class of particles. A first particle morphology may include particles that have a relatively high sphericity (such as nominally spherical particles, for example). A second particle morphology may include particles that have a relatively low sphericity (such as particles having a more of a faceted or angular morphology, for example). The term "round," as used herein, refers to the class of ceramic particles having a comparatively high sphericity. The term "angular," as used herein, refers to ceramic particles having a lower sphericity than the "round" class of particles.

In some embodiments, the first particle morphology may have a first sphericity and the second particle morphology may have a second sphericity, with the second sphericity being less than the first sphericity. In physical terms, the ceramic particles of the first particle morphology may be more "sphere-like" than the ceramic particles of the second particle morphology. These more sphere-like particles may help to maintain sufficiently low slurry viscosity for efficient flow, such as in additive manufacturing processes.

Generally, particles of the first particle morphology may have a higher roundness than particles of the second particle morphology, and an aspect ratio closer to about 1. These characteristics are indicative of the particles of the first particle morphology being closer to sphere-shaped than the particles of the second particle morphology. In some embodiments, the sphericity of the ceramic particles of the first particle morphology may be at least about 0.9, such as at least about 0.95, or such as at least about 0.98. The ceramic particles of the second particle morphology may be less spherical, and in some cases may exhibit faceted or angular morphology. Ceramic particles with lower sphericity tend to reduce densification of the overall mixture of ceramic particles in the slurry during firing, thereby preserving a desirable level of porosity in the resulting ceramic article. In some embodiments, the sphericity of the ceramic particles of the second particle morphology may be less than about 0.9, such as less than about 0.85, or such as less than about 0.8.

Other parameters are commonly applied in the art of particle shape characterization, and thus it will be apparent that in addition to, or in place of, sphericity, other parameters such as roundness (ratio of the average radius of curvature of the edges or corners to the radius of curvature of the maximum inscribed sphere) and aspect ratio (ratio of longest projection to smallest projection) may be used to differentiate the first particle morphology from the second particle morphology. Ceramic powders used in the art are routinely synthesized, milled, sieved, and/or otherwise processed to provide desired morphology and size distribution. Those skilled in the art will appreciate that vendors in the industry can readily supply particles having morphological characteristics, such as sphericity, that are specified by a purchaser.

The mixture of particle morphologies in the ceramic slurry may promote a lower viscosity, which may be desirable for additive manufacturing. For example, the round morphology of the round ceramic particles is believed to allow the round ceramic particles to easily slip past other ceramic particles in the ceramic slurry. However, round ceramic particles, when used alone in the slurry, may slip and rearrange into a more tightly packed structure during debind and sintering, resulting in undue levels of shrinkage and densification. To mitigate this effect, the disclosed ceramic slurry may also include less-spherical ceramic particles that are less prone to slip and rearranging during debind and sintering as a result of their different morphology. For example, angular particles may create and preserve voids (e.g., gaps, spaces) between the more spherical ceramic particles in the printed ceramic part. These voids may decrease packing of the ceramic particles, and as a result, may decrease shrinkage and densification of the 3D printed ceramic part during sintering.

Slurry properties may be affected in some cases not only by the relative concentration levels of the first and second particle morphology of particles, but also by their size. In particular, size differences between the two classes of particle morphologies may be manipulated to arrive at desired slurry characteristics. Therefore, in certain embodiments, the ceramic particles of the first particle morphology may have a different $d_{50}$ value from the ceramic particles of the second particle morphology; in particular embodiments, the $d_{50}$ of the first particle morphology of particles is greater than that of the second particle morphology of particles. For example, the efficacy with which the particles of the second particle morphology inhibit undue shrinkage and/or densification may be enhanced in some cases by having these particles relatively smaller than the particles of the first particle morphology, as for instance the particles having a less spherical morphology may be more readily situated between the larger, more spherical particles to maintain dimensional stability during consolidation. In alternative embodiments, the $d_{50}$ of the less spherical particles is greater than that of the more spherical particles; experiments have demonstrated that this composition may also result in desirable levels of porosity in processed articles.

Generally, the size of the ceramic particles used in a ceramic slurry may be described with reference to particle size distribution, such as a median diameter, sometimes referred to as "$d_{50}$". Exemplary ceramic particles may have a median particle size distribution ($d_{50}$) less than about 25 micrometers (μm). For example, the ceramic particles may have a $d_{50}$ of from about 1 μm to about 25 μm, such as from about 1 μm to about 25 μm, such as from about 2 μm to about 25 μm, such as from about 5 μm to about 15 μm, or such as from about 10 μm to about 15 μm.

In some embodiments, ceramic particles may have a multimodal (e.g., bimodal) size distribution. An exemplary ceramic slurry may include a first fraction of ceramic particles that has a first median diameter, $d_{50}$ (referred to as a first size fraction), and a second fraction of ceramic particles that has a second median diameter, $d_{50}$ (referred to as a second size fraction), with the first median diameter being larger than the second median diameter. The first size fraction may correspond to a first particle morphology, and/or the second size fraction may correspond to a second particle morphology. Additionally, or in the alternative, the first size fraction may include the particles from both the first particle morphology and the second particle morphology; and/or the second size fraction may include particles from both the first particle morphology and the second particle morphology. Conversely, the first particle morphology may include particles from both the first size fraction and the second size fraction; and/or the second particle morphology may include particles from both the first size fraction and the second size fraction.

The first size fraction of ceramic particles may have a median diameter, $d_{50}$, of about 8 micrometers to about 25 micrometers (μm), such as from about 10 μm to about 23 μm, or such as from about 15 μm to about 23 μm. In an exemplary embodiment, the first size fraction of ceramic particles may have a $d_{50}$ of about 22 μm. The second size fraction of ceramic particles may have a $d_{50}$ of about 0.5 μm to about 8 μm, such as from about 1 μm to about 5 μm, or such as from about 1 μm to about 3 μm. In an exemplary embodiment, the second size fraction of ceramic particles may have a $d_{50}$ of about 1.5 μm. In some embodiments, the ceramic particles of the first particle morphology may have a $d_{50}$ of from about 2 μm to about 10 μm, such as from about 4 μm to about 8 μm, and the ceramic particles of the second particle morphology may have a $d_{50}$ of from about 8 μm to about 25 μm, such as about 8 μm to about 15 μm, such as about 15 μm to about 20 μm, or such as about 20 μm to about 25 μm, with the $d_{50}$ of the ceramic particles of the second particle morphology being larger than the $d_{50}$ of the ceramic particles of the first particle morphology.

The ceramic particles may include any suitable ceramic particles, including, but not limited to, ceramic particles of: silica, alumina, zircon, zirconia, stabilized zirconias, sodium carbonates, sodium oxide, calcium oxide, calcium sulfate, calcium phosphates, calcium silicates, sodium borates, sodium silicates, boron trioxide, yttrium carbonate, yttrium oxide, yttrium aluminate, magnesium carbonate, magnesium oxide, titanium oxide, strontium oxide, strontium carbonate, potassium oxide, potassium carbonate, lithium oxide, lithium carbonate, aluminum hydroxide, aluminum oxyhydroxide, calcium carbonate, iron oxide, or ground glasses, silicon nitride, rare earth oxides, or rare earth carbonates, as well as combinations of these. In some embodiments, the ceramic particles may include silica, alumina, stabilized zirconias, calcium sulfates, or calcium phosphates, as well as combinations of these.

The ceramic particles are generally mixed with the binder to form a slurry. A total particle loading of the ceramic particles in the slurry may be from about 45% to about 75% by volume of the slurry. The first particle morphology and the second particle morphology of ceramic particles may each be loaded in any suitable relative proportion. For example, the slurry may include from about 20% to about 99% by volume ceramic particles of the first particle morphology and from about 1% to about 80% by volume ceramic particles of the second particle morphology. Examples of relative volume ratios of first particle morphology particles to second particle morphology particles include, without limitation, about 90:10, about 85:15, about 75:25, about 60:40, about 50:50, about 40:60, and about 30:70; selection of the relative ratio will depend on a number of factors, including, among others, the desired viscosity of the slurry, green strength of the cured article, and porosity of the finished article.

A ceramic slurry may include a first size fraction of ceramic particles in an amount of from about 80% to about 55% by volume (e.g., from about 55% to about 70%, from about 65% to about 80%, or from about 60% to about 70%), and a second size fraction of ceramic particles in an amount of from about 20% or about 45% by volume (e.g., from about 20% to about 35%, from about 30% to about 45%, or from about 25% to about 35%). In certain embodiments, the volume ratio of the ceramic particles of the first particle morphology to the ceramic particles of the second particle morphology may be at least about 1.5 (that is, at least about 3 parts by volume of the first particle morphology to about 2 parts by volume of the second particle morphology).

III. Photoreactive Organic Resins

As used herein, the term "photoreactive organic resin" generally refers to an organic resin molecule or polymer that suitably interacts with itself and/or with a photoreactive siloxane in a polymerization reaction under light-curing conditions. The term "photoreactive organic resin component" refers to a photoreactive organic resin as included in a Pr-Ps hybrid binder. An exemplary photoreactive organic resin component of a Pr-Ps hybrid binder may include one or more acrylates, one or more epoxies, one or more oxetanes, one or more vinyl ethers, or one or more thiols, as well as combinations of these. In various embodiments, various photoreactive organic resins may exhibit respectively different curing mechanisms. For example, acrylates and thiols may undergo a free radical cure, epoxies and oxetanes may undergo a cationic cure, and vinyl ethers may undergo both free radical and cationic curing. In exemplary embodiments, a photoreactive organic resin component of a Pr-Ps hybrid binder may include an acrylate, such astrimethylolpropane ethoxylate triacrylate, trimethylolpropane propoxylate triacrylate (TMPPTA), tricyclodecane dimethanol diacrylate (TCDDMDA), isobornyl acrylate (IBOA), hexanediol diacrylate (HDDA), diurethane dimethacrylate, poly(propyleneglycol) dimethacrylate, tricyclodecane dimethanol diacrylate, tricyclodecane dimethanol dimethacrylate, pentaerythritol tetraacrylate, propoxylated (6) trimethylolpropane triacrylate, ethylene glycol phenyl ether methacrylate, an acrylated polyurethane (urethane acrylate), or an acrylated polyester, as well as combinations of these. In exemplary embodiments, the photoreactive organic resin component of the Pr-Ps hybrid binder may include an epoxy or oxetane, such as 3,4-epoxycyclohexylmethyl 3,4-epoxycyclohexanecarboxylate, or 3-ethyl-3-oxetanemethanol, or combinations thereof. In exemplary embodiments, the photoreactive organic resin component of the Pr-Ps hybrid binder may include a thiol, such as trimethylolpropane tris(3-mercaptoproprionate). In exemplary embodiments, the photoreactive organic resin component of the Pr-Ps hybrid binder may include a vinyl ether, such as cyclohexanedimethanol divinyl ether.

IV. Photoreactive Siloxanes

As used herein, the term "photoreactive siloxane" generally refers to a siloxane molecule or polymer that suitably interacts with itself and/or a photoreactive organic resin in a polymerization reaction under light-curing conditions. Exemplary photoreactive siloxanes may undergo free radical polymerization (e.g., copolymerizing or homopolymerizing) under light-curing conditions. The term "photoreactive siloxane component" refers to a photoreactive siloxane as included in a Pr-Ps hybrid binder. A photoreactive siloxane may include a molecule or polymer that has a chain of alternating siloxane units, as well as multiple (e.g., 2, 3, 4, 5, 6, or more) photoreactive sites (e.g., functional groups, such as vinyl groups) available for polymerization. The term "photoreactive siloxane" is intended to include any functional or multi-functional, short, siloxane molecules as well as longer, functional or multi-functional silicone polymers, that can polymerize under light-curing conditions. The term, "multi-functional" with respect to a photoreactive siloxane is intended to denote siloxane molecules or silicone polymers that have more than one functional group (e.g., more than one moiety) present that is available to participate in polymerization (e.g., homopolymerization, copolymerization, or a combination thereof) of one or more components in the Pr-Ps hybrid binder under light-curing conditions. By way of example, short siloxane molecules may include from about 3 to about 8 siloxane (Si—O) units, and/or one or more cyclic siloxanes. By way of example, a silicone polymer may include a straight-chain silicone polymer, a branched silicone polymer, or combinations of these, including copolymers and/or homopolymers. Exemplary photoreactive siloxanes include one or more functional groups that are capable of polymerizing (e.g., copolymerizing or homopolymerizing) under light-curing conditions. In exemplary embodiments, a photoreactive siloxane may include 2, 3, 4, 5, 6, 7, 8, or more functional groups such as acrylates (e.g., methacrylates, etc.), alkenyl groups, mercaptans, vinyl groups (e.g., vinyl ethers, etc.), epoxy groups, and other functional groups capable of polymerizing (e.g., copolymerizing or homopolymerizing) under light-curing conditions.

Exemplary photoreactive siloxane components that can be utilized in a Pr-Ps hybrid binder may include: tetravinyltetramethyl cyclotetrasiloxane ($D_4^{Vi}$), tetrakis(vinyldimethylsiloxy)silane ($M_4^{Vi}Q$), vinylmethoxysiloxane homopolymer (ViOMe, available as product number VMM-010 from Gelest, Inc. Morrisville, Pa.), vinylmethylsiloxane cyclics ($D_x^{Vi}$ cyclics, available as product number VMS-005 from Gelest, Inc.), mixed linear and cyclic siloxanes from the hydrolysis of mercaptopropylmethyldimethoxysilane (Dx'), and methacrylate functional silicone resins, as well as combinations of these. It should be noted that, in exemplary embodiments, the photoreactive siloxane component (e.g., $D_4^{Vi}$) may be capable of exclusively copolymerizing with a monomer of an organic resin (e.g., may be incapable of homopolymerization), while other monomers (e.g., methacrylate functional silicone resins) may be capable of both copolymerizing and homopolymerizing.

Preferably, a photoreactive siloxane may exhibit a char yield of at least about 80 wt. %, such as at least about 90 wt. %; however, lower char yields may also be suitable in some embodiments. For example, a photoreactive siloxane may exhibit a char yield of at least about 40 wt. %, such as at least about 50 wt. %, such as at least about 60 wt. %, or such as at least about 70 wt. %.

V. Photostable Siloxanes

As used herein, a "photostable siloxane" generally refers to a siloxane molecule or polymer that has a chain of alternating siloxane units, and/or a network of siloxane units, with terminal groups that exhibit photostability or low reactivity in respect of polymerization reactions in a Pr-Ps hybrid binder under light-curing conditions. Exemplary photostable siloxanes exhibit photostability or low reactivity in a Pr-Ps hybrid binder in respect of light-induced free radical polymerization (e.g., copolymerizing or homopolymerizing) under light-curing conditions. The term "photostable siloxane component" refers to a photostable siloxane as included in a Pr-Ps hybrid binder. A photostable siloxane may include short siloxane molecules as well as longer silicon polymers; however, shorter siloxane molecules may be more prone to evaporative loss, for example, when such shorter siloxane molecules exhibit photostability or low reactivity in respect of polymerization reactions under light-curing conditions. Such terminal groups of a photostable siloxane may include silane groups (Si—H), silanol groups (SiOH) or photostable substituents such as methyl groups ($CH_3$ or Me) or phenyl groups ($C_6H_5$ or Ph). The methyl groups of a photostable siloxane may include "M" units ($Me_3SiO$), "D" units ($Me_2SiO_2$), "T" units ($MeSiO_3$), or "Q" units ($SiO_4$), as well as combinations of these. Exemplary photostable siloxane may include a siloxane made up of D units and T units ("DT siloxane"), a siloxane made up of M units and Q units ("MQ siloxane"), a siloxane made up of M units, D units, and Q units ("MDQ siloxane"), a siloxane made up of M units, T units, and Q units ("MTQ siloxane"), or a siloxane made up of Q units, D units, and T units ("QDT siloxane"), as well as combinations of these. In an exemplary embodiment, a photostable siloxane may include a T units and/or Q units.

While a photostable siloxane may include a siloxane component made up of M units, D units, T units and/or Q units, in some embodiments a photoreactive siloxane and/or a photostable siloxane may include modified substituent units in which one or more of the methyl groups are substituted for another functional group, R. For example, a photoreactive siloxane may include "modified M" units ($RMe_2SiO$ or $R_1R_2MeSiO$), "modified D" units ($RMeSiO_2$ or $R_1R_2SiO_2$), or "modified T" units ($RSiO_3$), as well as combinations of these. Such modified M, D, and/or T units may include any suitable functional group in the place of R, $R_1$ and/or $R_2$, including, by way of example, alkyl groups, phenyl groups, and/or polyether groups. In some embodiments, modified substituent units may improve the solubility of the siloxane component in the Pr-Ps hybrid binder. It will be appreciated, however, that while larger functional groups (e.g., relative to Me groups) may enhance the solubility of a siloxane component in the Pr-Ps hybrid binder, the larger functional groups also dilute the concentration of silicon in the Pr-Ps hybrid binder. However, by carefully controlling the introduction of modified substituent units, desirable photoreactive or photostable siloxane components may be provided with a balance between solubility and silicon concentration in the Pr-Ps hybrid binder.

Exemplary photostable siloxane components that can be utilized in a Pr-Ps hybrid binder include photostable silicone resins, such as silicone resins that have a DT siloxane ("DT silicone resin"), an MQ siloxane ("MQ silicone resin"), an MDQ siloxane ("MDQ silicone resin"), an MTQ siloxane ("MTQ silicone resin"), and/or a QDT siloxane ("QDT silicone resin"). Further exemplary photostable siloxanes include methyl phenyl silicone resins. One particularly suitable photostable siloxane that includes a methyl phenyl silicone resin is SR355, available from Momentive Performance Materials, of Waterford, N.Y. While the terminal groups methyl phenyl silicone resins such as SR355 may include terminal groups (e.g., silanol groups) that exhibit some photoreactivity in respect of polymerization reactions with photoreactive organic resins that include epoxy groups, methyl phenyl silicone resins such as SR355 are considered a photostable siloxane because they do not include the photoreactive functional groups found in a photoreactive siloxane (e.g., acrylate groups, alkenyl groups, mercaptan groups, vinyl groups, epoxy groups, etc.). Indeed, methyl phenyl silicone resins such as SR355 exhibit photostability or low reactivity in respect of polymerization reactions with photoreactive organic resins that include acrylate groups, for example, as opposed to epoxy groups.

For purposes of clarity, the term "photostable siloxane" does not include photoreactive siloxanes. Thus, a photostable siloxane does not include the photoreactive functional groups found in a photoreactive siloxane. For example, the photoreactive functional groups (e.g., acrylate groups, alkenyl groups, mercaptan groups, vinyl groups, epoxy groups, etc.) found in exemplary photoreactive siloxanes are absent from exemplary photostable siloxane components. By way of example, a photoreactive siloxane may be at least about 10 times more photoreactive than a photostable siloxane, such as at least about 50 times more photoreactive or at least about 100 times more photoreactive than a photostable siloxane under light-curing conditions.

While photostable siloxanes are generally stable under light-curing conditions, it will be appreciated, that a photostable siloxane may include functional groups that exhibit reactivity under heat-curing conditions (e.g., during firing or partial firing). Additionally, or in the alternative, a photostable siloxane may interact with the photoreactive organic resin through hydrogen bonding.

By way of example, such reactivity under heat-curing conditions may be provided at least in part by one or more functional groups in a photostable siloxane that are available to participate in polymerization (e.g., homopolymerization, copolymerization, or a combination thereof) under heat-curing conditions (e.g., during firing or partial firing). A photostable siloxane may include a molecule or polymer that has a chain of alternating siloxane units, as well as multiple (e.g., 2, 3, 4, 5, 6, or more) functional groups that are available for polymerization under heat-curing conditions. Exemplary functional groups of a photostable siloxane include silane groups (Si—H), silanol groups (SiOH), and alkoxy functional groups. Exemplary alkoxy functional groups include methoxy groups ($CH_3O$—), ethoxy groups ($CH_3CH_2O$—), and phenoxy groups ($C_6H_5O$—). A photostable siloxane may include functional or multi-functional, short, siloxane molecules as well as longer, functional or multi-functional silicone polymers, that can polymerize under heat-curing conditions (e.g., during firing or partial firing). The term, "multi-functional" with respect to a photostable siloxane is intended to denote photostable siloxane molecules or silicone polymers that have more than one functional group (e.g., more than one moiety) present that is available to participate in polymerization (e.g., homopolymerization, copolymerization, or a combination thereof) with one or more components in the Pr-Ps hybrid binder under heat-curing conditions (e.g., during firing or partial firing). By way of example, short siloxane molecules may include from about 3 to about 8 siloxane (Si—O) units, and/or one or more cyclic siloxanes. Such silicone polymers may include a straight-chain silicone polymer, a branched silicone polymer, or combinations of these, including copolymers and/or homopolymers.

Exemplary photostable siloxane components that can be utilized in a Pr-Ps hybrid binder include, by way of example, photostable siloxanes that contain one or more silicon hydride groups, and/or photostable siloxanes that include a methyl phenyl silicone resin. Suitable photostable siloxanes that contain a silicon hydride group include: polymethylhydrosiloxane (PHMS), phenylmethylsiloxane, or methylhydrosiloxane-phenylmethylsiloxane copolymers, as well as combinations of these. One particularly suitable photostable siloxane that contains such a silicon hydride group is HPM- 502 (methylhydrosiloxane-phenylmethylsiloxane copolymer, hydride terminated) available from Gelest, Inc. One particularly suitable photostable siloxane that contains a methyl phenyl silicone resin is SR355, available from Momentive Performance Materials.

Preferably, suitable photostable siloxane components exhibit a char yield of at least about 20 wt. %, such as at least about 30 wt. %, such as at least about 40 wt. %, such as at least about 50 wt. %, such as at least about 60 wt. %, such as at least about 70 wt. %, or such as at least about 80 wt. %. Such char yield is indicative of the free silica yield available from the photostable siloxane. The free silica yield from a photostable siloxane may depend, for example, on the molecular weight and degree of branching of the photostable siloxane.

VI. Photoinitiators

A ceramic slurry may include at least one photoinitiator. A photoinitiator may be provided to initiate polymerization of the photoreactive organic resin component(s) and/or the photoreactive siloxane component(s) under applicable light-curing conditions. As used herein, the term "photoinitiator" refers to a compound that has a catalytic effect on a curing reaction of a Pr-Ps hybrid binder under light-curing conditions. As used herein, "light-curing conditions" refers to exposure to electromagnetic radiation having a wavelength within a photoactivation wavelength range corresponding to a photoinitiator and/or one or more components in a Pr-Ps hybrid binder (e.g., a photoreactive organic resin component and/or a photoreactive siloxane component).

The photoinitiator may include any suitable structure capable of absorbing light (e.g., UV, visible light) emitted by the activation energy source and, in response, promoting the copolymerization of an organic resin component and/or a photoreactive siloxane component in the Pr-Ps hybrid binder. For example, in exemplary embodiments, the photoinitiator may be or include: 2-hydroxy-2-methylpropiophenone (MVP); phenyl bis(2,4,6-trimethylbenzoyl) phosphine oxide (PBTMBPO) (e.g., OMNIRAD® 819, available from iGM Resins, Charlotte, N.C.); 2-hydroxy-2-methyl-1-phenyl-1-propanone (e.g., OMNIRAD® 1173, available from iGM Resins); diphenyl (2,4,6-trimethylbenzoyl) phosphine oxide (e.g., OMNIRAD® TPO, available from iGM Resins); or 1-hydroxycyclohexyl phenyl ketone (e.g., ONMIRAD® 184, available from iGM Resins) or other suitable photoinitiators. In exemplary embodiments, a photosensitizer and/or a photoacid generator may be used in conjunction with the photoinitiator to facilitate curing of the ceramic slurry. Exemplary photosensitizers include 4-benzoyl-4'methyl-diphenyl sulfide, isopropylthioxanthone, or 9,10-diethoxyanthracene, as well as combinations of these. Exemplary photoacid generators include diaryliodonium and triarylsulfonium salts, such as, (p-methylphenyl)iodonium tetrakis(pentafluorophenyl) borate, and sulfonium salts such as CYRACURE™ UVI-6976 or UVI-6990 (available from Dow Chemical, Midland, Mich., U.S.A.). Further exemplary photoacid generators include OMNICAT™ 432 and 550 (available from IGM Resins, Waalwijk, The Netherlands), IRGACURE® PAG 290 (available from BASF, Ludwigshafen, Germany), SL-6992 (available from Esstech, Inc., Essington, Pa., U.S.A.), iodonium salts (e.g., OMNIRAD® 250, available from iGM Resins), OMNICAT™ 440 (available from IGM Resins), and SILFORCE™ UV9380C., available from Momentive Performance Materials). In still another embodiment, a photoinitiator may include a two-component system, such as camphorquinone in combination with an amine such as N,N-dimethylaminoethyl methacrylate.

VII. Additives

In some embodiments, a photoreactive ceramic slurry may optionally include one or more additives, such as dispersants, organic solvents, and/or stabilizers. Suitable dispersants that may be utilized in a photoreactive ceramic slurry include polyethers (e.g., poly(ethylene oxide) or poly(propylene oxide)), long chain carboxylic acids (e.g., oleic acid, lauric acid, myrstic acid, or palmitic acid), or other long-chain molecules that have end functionality capable of interacting with the ceramic particles, as well as combinations of these. Exemplary dispersants include HYPERMER™ KD (e.g., KD1, KD2, KD25) and/or ZEPHRYM™ ColorFX dispersants, all available from Croda International Plc, East Yorkshire, United Kingdom; TRITON™ X-100 dispersants available from BASF, Ludwigshafen, Germany; and SOLSPERSE™ 24000SC dispersants available from The Lubrizol Corporation, Wickliffe, Ohio. In some embodiments, the presently disclosed Pr-Ps hybrid binders may have suitable properties to act as a dispersant, enabling the formulation of a slurry without requiring the use of other dispersants apart from the Pr-Ps hybrid binder.

In some embodiments, an exemplary ceramic slurry may or may not include an organic solvent. While ceramic slurries may sometimes require the addition of an organic solvent to obtain suitable miscibility/solubility of the organic resin and siloxane components, the presently disclosed ceramic slurries may have suitable properties to be formulated without the use of an organic solvent, at least partially due to the miscibility/solubility of the organic resin and siloxane component(s) of the Pr-Ps hybrid binder, for example, attainable when using both a photoreactive siloxane component and a photostable siloxane component in the Pr-Ps hybrid binder. Since organic solvents contribute additional organic content to be removed from the green ceramic part during partial firing, the use of solvents in the slurry can increase debind shrinkage and reduce the handling strength of the resulting brown ceramic part. Additionally, organic solvents undesirably increase the cost and the environmental impact of the process. As such, embodiments of the present disclosure may improve the handling strength of brown ceramic parts while also reducing cost and environmental impact.

Stabilizers may include any suitable molecule capable of interacting (e.g., reacting) with one or more other ingredients in the ceramic slurry to block an undesirable side reaction from occurring. For example, a stabilizer may interact or react with a photoreactive species in the ceramic slurry to block polymerization of the Pr-Ps hybrid binder before exposure to an activation source such as a photo initiator or other catalyst. In exemplary embodiments, the stabilizer may include t-butylcatechol, hydroquinone monomethyl ether (MEHQ), butylated hydroxytoluene (BHT), or combinations thereof.

VIII. Exemplary Formulations

Exemplary Pr-Ps hybrid binders include one or more photostable siloxane components, or one or more photostable siloxane components and one or more photoreactive siloxane components, that are generally miscible or soluble with the photoreactive organic resin component when in the ceramic slurry. In exemplary embodiments, the one or more photostable siloxane components, or the one or more photostable siloxane components and the one or more photoreactive siloxane components, remain miscible or soluble in the monomers (or mixture of monomers) of the photoreactive organic resin throughout curing. An exemplary Pr-Ps hybrid binder may include one or more photoreactive organic resins (e.g., trimethylolpropane propoxylate triacrylate, tricyclodecane dimethanol dimethacrylate, ethylene glycol phenyl ether methacrylate, urethane acrylate, pentaerythritol tetraacrylate, and/or propoxylated (6) trimethylolpropane triacrylate etc.), one or more photoreactive siloxanes (e.g., tetravinyltetramethyl cyclotetrasiloxane ($D_4^{Vi}$)), and one or more photostable siloxanes (e.g., a photostable siloxane component that includes a methyl phenyl silicone resin, and/or a photostable siloxane component that includes a silicon hydride group). Another exemplary Pr-Ps hybrid binder may include one or more photoreactive organic resins (e.g., trimethylolpropane propoxylate triacrylate, tricyclodecane dimethanol dimethacrylate, ethylene glycol phenyl ether methacrylate, urethane acrylate, pentaerythritol tetraacrylate, and/or propoxylated (6) trimethylolpropane triacrylate etc.), and one or more photostable siloxanes (e.g., a photostable siloxane component that includes a methyl phenyl silicone resin, and/or a photostable siloxane component that includes a silicon hydride group), without a photoreactive siloxane.

In some embodiments, the Pr-Ps hybrid binder may include approximately equal parts by weight of the photoreactive organic resin component and the total siloxane components (e.g., the sum of the photoreactive siloxane components and photostable siloxane components). In other embodiments, the Pr-Ps hybrid binder may have an organic resin to total siloxane component ratio (e.g., the sum of the photoreactive siloxane components and photostable siloxane components) of about 2:1 to about 5:1, such as from about 2:1 to about 4:1, such as from about 3:1, to about 5:1, by weight. In some embodiments, the Pr-Ps hybrid binder may include approximately equal parts of the photoreactive siloxane components and the photostable siloxane components, while in other embodiments, the Pr-Ps hybrid binder may have a photoreactive siloxane to photostable siloxane ratio of about 1:5 to about 5:1, such as from about 1:5 to about 1:1, such as from about 1:2 to about 4:1, such as from about 1:1 to about 1:4, such as from about 1:2 to about 1:5, such as from about 1:1 to about 5:1, such as from about 4:3 to about 4:1, such as from about 2:1 to about 4:1, such as from about 3:1 to about 4:1, by weight. The photoreactive organic resin component of the Pr-Ps hybrid binder is lost (e.g., decomposed, volatilized) during a partial firing step after curing, and is no longer present in the sintered ceramic part.

Exemplary embodiments of the present disclosure can produce a green ceramic part having either a copolymerized binder, a binder that includes an interpenetrating network of two homopolymers, or a mixture thereof. For example, with ceramic slurries that include a photoreactive siloxane (e.g., a methacrylate functional silicone resin) that is capable of homopolymerizing when cured with a particular photoreactive organic resin, the photoreactive organic resin component and the photoreactive siloxane component of the Pr-Ps hybrid binder may begin in the same phase within the ceramic slurry, and subsequently independently polymerize (e.g., in separate phases) to produce interpenetrating networks of the respective polymers. With ceramic slurries that include a photoreactive siloxane that exclusively copolymerizes (e.g., $D_4^{Vi}$, $M_4^{Vi}Q$) when cured with a particular photoreactive organic resin, the photoreactive siloxane component may remain substantially miscible or soluble with the photoreactive organic resin component as a single phase throughout curing. Such miscibility/solubility may be especially advantageous for ceramic slurries that include a photoreactive siloxane that is relatively volatile, because the miscibility/solubility may help ensure that the photoreactive siloxane is afforded an opportunity to react and cure before being volatilized.

(a) Comparative Compatibility of Photoreactive Siloxanes with Photoreactive Organic Resins For comparative analysis, the compatibility of photoreactive siloxanes with photoreactive organic resins was evaluated. Specifically, as shown in Table 1 below, potential combinations of photoreactive siloxanes and photoreactive organic resins were evaluated for use in various Pr-Ps hybrid binder formulations. In other words, because the photoreactive siloxanes and the photoreactive organic resins are respectively photoreactive, their compatibility with respect to one another was analyzed. Photostable siloxanes are generally expected to be compatible with various photoreactive siloxanes and the photoreactive organic resins that may be included together in a Pr-Ps hybrid binder.

For the comparative examples represented in Table 1, various copolymerizable photoreactive siloxanes were mixed with a photoreactive organic resin to determine compatibility. The photoreactive siloxane was added in an amount of about 20 wt. %. If a homogeneous blend was obtained, a photoinitiator was added and small samples of the blend were cured with UV light for 15 seconds using an OMNICURE® 2000 light source, available from Excelitas Technologies Corp., Waltham, Mass. The appearance of the cured films was then evaluated to look for phase separation. Finally, thermal gravimetric analysis (TGA) was performed using a TGA 7 thermogravimetric analyzer, available from Perkin Elmer, Waltham, Mass. The films were cured in air by heating from room temperature to 800° C. at a rate of 10° C./min. The amount of weight loss up to 300° C. was used to gauge relative cure, with lower weight loss (presumably due to less evaporation of unreacted monomers/reactive siloxanes) being indicative of a better cure. The char yield was also determined after continued heating up to 800° C.

For the char yield values indicated in Table 1, higher numbers indicate more efficient conversion of the photoreactive siloxane to silica. The data presented in Table 1 indicates that char yield generally is higher in formulations with better cure. It also indicates that cured samples that remain clear during the cure process tend to give higher char yields. In general, different photoreactive siloxanes have different theoretical maximum char yields depending on the weight percentage of silicon that each includes. Many of the theoretical maximum char yields reported in Table 1 are greater than about 80%, or more, of the theoretical maximum char yield for these photoreactive siloxanes at about 20 wt. % loading in the blends. Other theoretical maximum char yields in Table 1 are greater than about 50%, such as greater than about 60%, or such as greater than about 70%, of the theoretical maximum char yield for these photoreactive siloxanes at about 20 wt. % loading in the blends. In addition to the information listed in Table 1, certain photoreactive siloxanes, such as linear vinylmethylsiloxane homopolymer (VMS-T11, available from Gelest, Inc.), were determined to be unsuitable for the present disclosure after failing to form homogenous mixtures as indicated above with TCDDMDA, TMPPTA, or HDDA. For some embodiments shown in Table 1, the theoretical maximum char yield exceeds 100%, indicating that the photoreactive siloxane had not fully converted to silica during TGA heating and that more time or a higher-temperature heat treatment may be required for complete conversion.

TABLE 1

Comparative compatibility of photoreactive siloxanes with photoreactive organic resins.

| Siloxane | Organic Resin | Photoinitiator | Appearance after cure | Wt. Loss <300° C. (%) | Char Yield (%) | Char % of Theoretical |
|---|---|---|---|---|---|---|
| $D_4^{Vi}$ | TCDDMDA | PBTMBPO | Clear | 1.56 | 11.69 | 84 |
| $D_4^{Vi}$ | TMPPTA | PBTMBPO | Clear | 2.13 | 11.65 | 84 |
| $M_4^{Vi}Q$ | TCDDMDA | HMPP | Hazy | 9.06 | 3.46 | 25 |
| $M_4^{Vi}Q$ | HDDA | HMPP | Gross phase separation | NT | NT | NT |
| $M_4^{Vi}Q$ | TMPPTA | HMPP | Hazy | 10.68 | 5.49 | 40 |
| $M_4^{Vi}Q$ | IBOA | HMPP | Clear | 9.22 | 7.9 | 57 |
| $Dx'$ | TCDDMDA | HMPP | Clear | 3.69 | 9.17 | 102 |
| $Dx^{vi}$ cyclics | TCDDMDA | HMPP | Clear | 4.55 | 9.92 | 71 |
| ViOMe | TCDDMDA | HMPP | Clear | 2.95 | 13.93 | 118 |

NT indicates "not tested."

In exemplary embodiments, the photoreactive siloxane may exclusively copolymerize with the photoreactive organic resin (as opposed to also undergoing homopolymerization) under light-curing conditions. For example, the exclusive copolymerization of $D_4^{Vi}$ was confirmed using example reactions in which certain samples included $D_4^{Vi}$ and a photoinitiator (e.g., OMNIRAD® 819), while other samples include $D_4^{Vi}$, a photoinitiator, and a photoreactive organic resin (e.g., isobornyl acrylate). Thin films of both sets of samples were prepared and exposed to a suitable activation light source (e.g., OMNICURE® Series 2000 UV light source) for 15 seconds. After light exposure, the samples that lacked the photoreactive organic resin remained a low-viscosity liquid, and nuclear magnetic resonance (NMR) analysis confirmed that no reaction (e.g., no homopolymerization) had occurred.

With this in mind, it is surprising that such high char yields were observed for the disclosed photoreactive siloxanes. Certain photoreactive siloxanes (e.g., $D_4^{Vi}$) did not demonstrate any propensity towards homopolymerization under light-curing conditions. It is believed that the cured blend of a photoreactive siloxane with a photoreactive organic resin (e.g., $D_4^{Vi}$/photocurable acrylate blend) would contain relatively isolated siloxane units (e.g., cyclotetrasiloxane) surrounded by organic chains (e.g., polyacrylate). The organic portion of the photoreactive siloxane/organic resin blend is removed by thermal decomposition and vaporization during partial firing, while the siloxane portion is converted to silica. Yet, despite these siloxane units being relatively isolated, as noted in the examples, silica formation upon firing is unexpectedly efficient. For example, as noted above, the disclosed photoreactive siloxanes surprisingly demonstrated theoretical maximum char yields indicating more than about 80 wt. % of the siloxane content is converted to silica. Inclusion of photostable siloxane components in combination with the photoreactive siloxane components can provide even greater conversion to silica.

(b) Methods of Forming a Ceramic Part

With the foregoing in mind, FIG. 1 shows a flow diagram depicting an exemplary method 100 for manufacturing a ceramic part using a photoreactive ceramic slurry (e.g., a ceramic slurry that includes a Pr-Ps hybrid binder). The exemplary method 100 optionally begins, at block 102, with forming a photoreactive ceramic slurry. The photoreactive ceramic slurry may include a Pr-Ps hybrid binder, ceramic particles, and, optionally, one or more additives (e.g., one or more photoinitiators, dispersants, stabilizers, etc.). It will be appreciated that the ingredients may be mixed in different orders. For example, in exemplary embodiments, first the organic resin and siloxane portions may be added, then the additives may be added, and then ceramic particles may be added, thereby forming the photoreactive ceramic slurry. In exemplary embodiments, the slurry may be mechanically mixed, mixed by hand, or a combination thereof, to achieve the desired consistency. Alternatively, the exemplary method 100 may begin with a photoreactive ceramic slurry that was previously formulated.

At block 104, the exemplary method 100 includes depositing a layer of the photoreactive ceramic slurry. As set forth above, in exemplary embodiments, the layer of the photoreactive ceramic slurry may be deposited on a platform of a 3D printer or on top of a previously cured layer of the part. The deposited layer may range in thickness from a few microns to several millimeters. In exemplary embodiments, the thickness of the deposited slurry layer may be less than the penetration depth of the light source used to cure the slurry to ensure that the entire layer completely cures upon irradiation.

The exemplary method 100 continues, at block 106, with irradiating portions of the deposited layer of photoreactive ceramic slurry material with a light source suitable to polymerize at least some of the Pr-Ps hybrid binder to yield a portion (e.g., a layer) of a green ceramic part. For example, in exemplary embodiments, the light source (e.g., laser, lamp, LED) is capable of selectively providing electromagnetic activation energy in the UV range (e.g., wavelength less than or equal to about 380 nanometers (nm)) or in the visible range (e.g., wavelength from about 380 nm to about 700 nm), for example, from about 250 nm to about 500 nm. As indicated by arrow 105, the steps represented by blocks 104 and 106 may be repeatedly performed to build up an entire green ceramic part in a layer-by-layer manner. In exemplary embodiments, a solvent may be applied to the green ceramic part (e.g., between layer deposition, after printing of the green ceramic part is complete) to remove any uncured slurry from the cured portions of the green ceramic part.

The exemplary method 100 continues, at block 108, with partially firing (e.g., debinding) the green ceramic part at a temperature below the sintering temperature of the ceramic particles to yield a brown ceramic part. During partial firing, at least some of the inorganic portion of the Pr-Ps hybrid binder (e.g., the silicon-containing portion) may be converted to silica, while at least some of the organic portion of the Pr-Ps hybrid binder (e.g., the hydrocarbon portion, the carbon and hydrogen portion) may be decomposed (e.g. volatilized). The temperature for the partial firing step of block 108 should be sufficiently high to ensure that the organic portion of the Pr-Ps hybrid binder decomposes and is released from the green ceramic part, while also ensuring that a substantial proportion of the siloxane component(s) converts to silica within the green ceramic part. In exemplary embodiments, the partial firing may be performed at a temperature of greater than about 500° C., such as from about 500° C. to about 1000° C., or such as from about 500° C. to about 1200° C. In some embodiments, the green ceramic part may first be heated to a maximum temperature (e.g., about 1200° C.) at a slow ramp over the course of about 1 to about 5 days, such as about 1 to about 2 days, or longer, and then the maximum temperature may be maintained for about 30 minutes or more.

While the temperature of the partial firing (debinding) of block 108 is generally below the sintering temperature of the particular ceramic particles used to manufacture a green ceramic part, a limited amount of sintering may occur during the partial firing step. It may be desirable for a limited amount of sintering to occur during partial firing, as this may increase the strength of the brown ceramic part. However the limited sintering occurring in the partial firing step should represent only a small amount of fusion between the ceramic particle surfaces. As such, it is believed that silica from the Pr-Ps hybrid binder produced from the partial firing is the primary contributor to the observed improvement in handling strength of the brown ceramic part. Additionally, the green ceramic part generally experiences shrinkage (e.g., debind shrinkage) during the partial firing step of block 108 and, in general, less debind shrinkage is generally beneficial to the quality and yield of the sintered ceramic part.

The exemplary method 100 continues, at block 110, with completely firing (sintering) the brown ceramic part at a temperature at or above the sintering temperature of the ceramic particles to yield the sintered ceramic part. During this sintering step, the brown ceramic part is heated to a temperature in which the ceramic particles fuse into a substantially continuous ceramic part. For example, for embodiments that utilize silica ceramic particles, the complete firing step at block 110 may involve heating to a temperature of greater than about 1200° C. (e.g., from about 1200° C. to about 1600° C.) for a duration of about 1 hour to about 24 hours. For embodiments that utilize alumina ceramic particles, the complete firing step at block 110 may involve heating to a temperature of greater than about 1600° C. (e.g., from about 1600° C. to about 2000° C., such as from about 1600° C. to about 1900° C.) for from a duration of about 1 hour to about 24 hours. The brown ceramic part generally experiences shrinkage (e.g., sintering shrinkage) during the complete firing step at block 110 and, in general, less sintering shrinkage is generally beneficial to the quality and yield of the ceramic part.

When certain ceramic particles other than silica are used, silica from the Pr-Ps hybrid binder formed by the oxidative decomposition of the Pr-Ps hybrid binder during the partial firing step at block 108 may react with the ceramic particles to form silicates between ceramic particles, which can further increase the strength and/or reduce sintering shrinkage of the ceramic part. For example, such ceramic particles include alumina, yttrium oxide, zirconia, sodium carbonates, calcium oxide, magnesium oxide, and others. When alumina ceramic particles are used, silica from the Pr-Ps hybrid binder present in the brown ceramic part from the partial firing of the siloxane portion of the Pr-Ps hybrid binder (in block 108) may react with the alumina ceramic particles at high temperature (e.g., about 1600° C.) to form aluminosilicate (e.g., mullite) between ceramic particle boundaries during the sintering step of block 110. The formation of such silicates represents an example of reaction bonding, which further increases the handling strength of the sintered ceramic part. In some embodiments, the partial firing step at block 108 and the complete firing step at block 110 may be combined into a single firing step, in which the green ceramic part first undergoes debinding and, subsequently sintering, without necessarily being handled in between. In those instances, while the improvement in the brown ceramic strength may be less relevant, embodiments of the presently disclosed Pr-Ps hybrid binder may still enable improvements in terms of improved strength, better dimensional precision, and/or reduced shrinkage in the sintered ceramic part.

EXAMPLES

Comparative Examples 1-11. Blends of Photoreactive Organic Resins and Photoreactive Siloxanes Comparative Example 1—Photoreactive Organic Resins A photoreactive organic resin blend was prepared by mixing the following photoreactive organic resins: 23 grams (g) of trimethylolpropane ethoxylate triacrylate, 10 g of tricyclodecane dimethanol diacrylate, and 17 g of diurethane dimethacrylate; and the following photoinitiator and stabilizer: 1 g of phenyl bis(2,4,6-trimethylbenzoyl) phosphine oxide, and 0.05 g t-butylcatechol. Next, a ceramic slurry was prepared by mixing 38.05 g of this blend was mixed with 129.23 g of alumina powder with a 22 μm $d_{50}$, 32.42 g of alumina powder with a 1.5 μm $d_{50}$, and 0.42 g of HYPERMER™ KD-2 dispersant. Comparative Example 1 demonstrates a ceramic slurry that does not include a siloxane and is provided for comparative purposes.

Comparative Example 2—Photoreactive Organic Resins with Photoreactive Siloxane

A blend containing photoreactive organic resins and a photoreactive siloxane was prepared by mixing the following photoreactive organic resins: 20 g of trimethylolpropane propoxylate triacrylate, 20 g of tricyclodecane dimethanol diacrylate, and 40 g of diurethane dimethacrylate; the following photoreactive siloxane: 20 g tetravinyltetramethyl cyclotetrasiloxane ($D_4^{vi}$); and the following photoinitiator and stabilizer: 2 g of phenyl bis(2,4,6-trimethylbenzoyl) phosphine oxide, and 0.1 g t-butylcatechol. Next, a slurry was prepared by mixing 38 g of the photoreactive organic resins/photoreactive siloxane blend with 129.28 g of alumina powder with a 22 μm $d_{50}$, 32.30 g of alumina powder with a 1.5 μm $d_{50}$, and 0.43 g of HYPERMER™ KD-2 dispersant. The alumina powders were the same as those used in comparative Example 1.

Comparative Example 3—Photoreactive Organic Resins with Photoreactive Siloxane

A blend containing photoreactive organic resins and a photoreactive siloxane was prepared by mixing the following photoreactive organic resins: 20 g of trimethylolpropane propoxylate triacrylate, 40 g of tricyclodecane dimethanol diacrylate, and 21 g of poly(propyleneglycol) dimethacrylate; the following photoreactive siloxane: 19 g tetravinyltetramethyl cyclotetrasiloxane ($D_4^{vi}$), and the following photoinitiator and stabilizer: photoinitiator/additive: 2 g of phenyl bis(2,4,6-trimethylbenzoyl) phosphine oxide, and 0.1 g t-butylcatechol. Next, a slurry was prepared by mixing 35.12 g of the photoreactive organic resins/photoreactive siloxane blend with 131.58 g of alumina powder with a 22 μm $d_{50}$, 32.92 g of alumina powder with a 1.5 nm $d_{50}$, and 0.45 g of HYPERMER™ KD-25 dispersant. The alumina powders were the same as those used in comparative Example 1.

Comparative Example 4—Photoreactive Organic Resins with Photoreactive Siloxane Another slurry was prepared by mixing 35.10 g of the photoreactive organic resins/photoreactive siloxane blend from comparative Example 3 with 131.62 g of alumina powder with a 22 µm $d_{50}$, 32.93 g of alumina powder with a 1.5 µm $d_{50}$, 0.30 g of HYPERMER™ KD-25 dispersant, and 0.15 g of ZEPHRYM™ Color FX dispersant. The alumina powders were the same as those used in comparative Example 1.

Comparative Example 5—Photoreactive Organic Resins with Methacrylated Photoreactive Siloxane (Formed from a Photostable Siloxane)

A. Preparation of Methacrylated Photoreactive Siloxane A

A photoreactive siloxane was prepared from a photostable siloxane as follows: 17 g of SR355 silicone resin was dissolved in 40 mL chloroform. Next, 7.6 g of 3-methacryloxypropyldimethylmethoxysilane was added followed by a blend of 0.7 g formic acid, 10 mL chloroform, and 0.5 g dibutylamine. The result was heated to reflux in air until nuclear magnetic resonance (NMR) showed the reaction to be complete. The volatiles were then stripped under vacuum. The resulting residue was dissolved in fresh chloroform, washed three times with deionized water, and washed once with saturated sodium chloride. After drying over anhydrous sodium sulfate, the solvent was removed on a rotary evaporator yielding 24 g of product as a viscous oil.

B. Preparation of Alumina Slurry

A blend containing photoreactive organic resins and a photoreactive siloxane was prepared by mixing the following photoreactive organic resins: 10 g of trimethylolpropane propoxylate triacrylate, 10 g of tricyclodecane dimethanol diacrylate, and 20 g of diurethane dimethacrylate; with the following photoreactive siloxane: 10 g of the methacrylated photoreactive siloxane A (described above); and the following photoinitiator and stabilizer: 1 g of phenyl bis(2,4,6-trimethylbenzoyl) phosphine oxide, and 0.05 g t-butylcatechol. Next, a slurry was prepared by mixing 38.07 g of this photoreactive organic resins/photoreactive siloxane blend with 129.24 g of alumina powder with a 22 µm $d_{50}$, 32.37 g of alumina powder with a 1.5 µm $d_{50}$, and 0.42 g of HYPERMER™ KD-2 dispersant. The alumina powders were the same as those used in comparative Example 1.

Comparative Example 6—Photoreactive Organic Resins with Methacrylated Photoreactive Siloxane (Formed from a Photostable Siloxane)

A. Preparation of Methacrylated Photoreactive Siloxane B

A photoreactive siloxane was prepared from a photostable siloxane as follows: 25 g of SR355 silicone resin was dissolved in 40 mL chloroform along with 0.03 t-butylcatechol. Next, 8.8 g of 3-methacryloxypropyldimethylmethoxysilane was added followed by a blend of 1 g formic acid, 25 mL chloroform and 0.74 g dibutylamine. The result was heated to reflux overnight and then allowed to cool to room temperature. After washing three times with deionized water and once with saturated sodium chloride, the solution was dried over anhydrous sodium sulfate. The volatiles were then removed on a rotary evaporator to give 37.4 g of product as a viscous oil.

B. Preparation of Alumina Slurry

A blend containing photoreactive organic resins and a photoreactive siloxane was prepared by mixing the following photoreactive organic resins: 33 g of trimethylolpropane propoxylate triacrylate, 14 g of tricyclodecane dimethanol diacrylate, and 25 g of diurethane dimethacrylate; with the following photoreactive siloxane: 28 g of methacrylated photoreactive siloxane B (described above); and the following photoinitiator and stabilizer: 2 g of phenyl bis(2,4,6-trimethylbenzoyl) phosphine oxide, and 0.1 g t-butylcatechol. Next, a slurry was prepared by mixing 38.07 g of this photoreactive organic resins/photoreactive siloxane blend with 129.24 g of alumina powder with a 22 µm $d_{50}$, 32.37 g of alumina powder with a 1.5 µm $d_{50}$, and 0.42 g of a HYPERMER™ KD-2 dispersant. The alumina powders were the same as those used in comparative Example 1.

Comparative Example 7—Photoreactive Organic Resins with Photoreactive Siloxane that has Methyl Functional Groups A blend containing photoreactive organic resins and a photoreactive siloxane was prepared by mixing the following photoreactive organic resins: 12.5 g of trimethylolpropane propoxylate triacrylate, 15 g of tricyclodecane dimethanol diacrylate, and 12.5 g of diurethane dimethacrylate; the following photoreactive siloxane: 10 g vinylmethoxysiloxane homopolymer; and the following photoinitiator and stabilizer: 1 g of phenyl bis(2,4,6-trimethylbenzoyl) phosphine oxide and 0.05 g t-butylcatechol. Next, a slurry was prepared by mixing 38.03 g of this photoreactive organic resins/photoreactive siloxane blend with 129.25 g of alumina powder with a 22 µm $d_{50}$, 32.30 g of alumina powder with a 1.5 µm $d_{50}$, and 0.41 g of HYPERMER™ KD-25 dispersant. The alumina powders were the same as those used in comparative Example 1.

Comparative Examples 1-7. Partially Firing and Sintering Photoreactive Organic Resins/Photoreactive Siloxane Blends For comparative Examples 1-7 described above, the ceramic slurry was mixed (e.g., by hand, and then with a SPEEDMIXER™ brand mixer available from Flack Tek Inc, Landrum, S.C.). A multi-layered 5 cm×5 cm plate was prepared on a glass slide by coating each layer using a doctor blade, then curing the layer for 15 seconds with UV light (e.g., OMNICURE® 2000 UV light), followed by coating the next layer. A total of from 5 to 10 layers were cured resulting in a net thickness of from about 0.5 mm to about 1.5 mm.

The cured samples the resulting material from comparative Examples 1-7 were then cut into bars to measure firing shrinkage. For each cured plate, the outer 1 centimeter (cm) perimeter was removed. Six bars were cut out of the central portion of the plate using a wet diamond saw. Each bar was from about 15 mm to about 20 mm long and from about 1.5 mm to about 2.5 mm wide. The thickness of each bar was defined by the thickness of the cured plate, which was from about 0.5 mm to about 1.5 mm. The lengths of all six bars were measured with calipers using 0.01 mm precision before and after firing to determine the net linear firing shrinkage. During partial firing (debinding), the cured bars were immersed in fine alumina sand and slowly fired over 2 days up to 1200° C. with a 30 minute soak (e.g., holding temperature constant at about 1200° C. for 30 minutes) to remove the binder. The shrinkage measured after the debinding step is referred to herein as the debind shrinkage. Most of the shrinkage at the debind step is due to the oxidative decomposition of the binder from about 200° C. to about 400° C., but some minor sintering shrinkage from about 1000° C. to about 1200° C. may also be included. In exemplary embodiments, the samples may be fired up to about 1200° C. during partial firing to slightly sinter so that they can be sufficiently strong to be handled to measure the net length. As indicated in Table 2, the average debind shrinkage of the cured photoreactive ceramic slurries during debinding is similar to the debind shrinkage of comparative Example 1, which does not include a siloxane component. It may be noted that certain comparative examples (e.g., comparative Examples 2 and 6) actually demonstrate a lower debind shrinkage than comparative Example 1, which does not include a siloxane component.

TABLE 2

Average debind and sintering shrinkage for comparative examples 1-7

| Comparative Example | Average Debind Shrinkage (%) | Average Sintering Shrinkage (%) | Total Shrinkage (%) |
|---|---|---|---|
| 1 | 2.70 | 1.37 | 4.07 |
| 2 | 2.17 | 0.49 | 2.66 |
| 3 | 3.35 | 0.04 | 3.39 |
| 4 | 2.98 | 0.12 | 3.10 |
| 5 | 3.14 | 0.35 | 3.49 |
| 6 | 2.52 | 0.18 | 2.70 |
| 7 | 3.18 | 0.39 | 3.57 |

Subsequently, the bars were completely fired (sintered) on a porous alumina plate up to 1600° C. with a 3 hour soak (e.g., holding temperature constant at about 1600° C. for 3 hours) to further sinter the alumina and/or react the binder-derived silica with the alumina to form aluminosilicate. The shrinkage measured during the complete firing step (e.g., up to about 1600° C.) is referred to as the sintering shrinkage. As indicated in Table 2, the average sintering shrinkage of the photoreactive ceramic slurry during sintering is substantially less than the sintering shrinkage of Example 1, which does not include a siloxane component. For example, comparative Examples 2-7 in Table 2 demonstrate a photoreactive ceramic slurry with a sintering shrinkage that is more than about 50% lower, more than about 75% lower, more than about 90% lower, more than about 95% lower, or more than about 97% lower than the sintering shrinkage of the photoreactive organic resin of comparative Example 1 that did not include a siloxane component. As indicated in Table 2, in exemplary embodiments, the total shrinkage of the ceramic part across the partial firing and sintering steps may be less than about 4%, less than about 3%, or less than about 2.75%. The lower sintering shrinkage may be attributed to the reaction between the Pr-Ps hybrid binder-derived silica and the alumina particles to form aluminosilicate, which reduces alumina densification and, thereby, reduces sintering shrinkage.

Comparative Examples 8-11—Effects of Partial Firing and Sintering on Photoreactive Organic Resins/Photoreactive Siloxane Blends Comparative Examples 8-11 are examples of blends of photoreactive organic resins and photoreactive siloxanes without ceramic particles, that were manufactured, partially fired (e.g., up to about 300° C.), and sintered (e.g., up to about 800° C.), and the weight loss monitored via thermogravimetric analysis (TGA). While these comparative examples lack the ceramic particles of the actual ceramic product, comparative Examples 8-11 serve as examples of the composition and nature of blends of photoreactive organic resins with photoreactive siloxanes throughout the manufacturing process. Comparative Example 8 demonstrates a photoreactive siloxane that exclusively copolymerizes and is miscible or soluble with the photoreactive organic resin throughout curing. By contrast, comparative Examples 9-11 demonstrate photoreactive siloxanes that extensively homopolymerize and, therefore, the photoreactive siloxanes are miscible or soluble with the photoreactive organic resins prior to curing, but separate into separate phases during the curing process.

Comparative Example 8—Light-Curing and Sintering of Photoreactive Organic Resins/Photoreactive Siloxane Blend A blend containing photoreactive organic resins and a photoreactive siloxane was prepared by mixing the following organic resins: 1.60 g of a blend containing 2 g of trimethylolpropane propoxylate triacrylate, 2 g of tricyclodecane dimethanol diacrylate, 1.5 g of diurethane dimethacrylate, and 0.40 g of trimethylolpropane tris(3-mercaptoproprionate); the following photoreactive siloxane: 2 g tetravinyltetramethyl cyclotetrasiloxane ($D_4^{Vi}$); and the following photoinitiator: 0.2 g of phenyl bis(2,4,6-trimethylbenzoyl) phosphine oxide. A small portion of this blend was UV cured and analyzed by TGA in air. The weight loss up to 300° C. was about 1.5% and the char yield after heating to 800° C. was about 11.4%.

Comparative Example 9—Light-Curing and Sintering of Photoreactive Organic Resins/Photoreactive Siloxane Blend A blend containing photoreactive organic resins and a photoreactive siloxane was prepared by mixing the following organic resin: 6.5 g of 3,4-epoxycyclohexylmethyl 3,4-epoxycyclohexanecarboxylate, and 1.5 g 3-ethyl-3-oxetanemethanol; the following photoreactive siloxane: 2.0 g of methacrylated photoreactive siloxane B (described above); and the following photoinitiators: 0.40 g (p-isopropylphenyl) (p-methylphenyl)iodonium tetrakis(pentafluorophenyl) borate, 0.10 g 4-benzoyl-4'methyl-diphenyl sulfide and 0.15 g 1-hydroxycyclohexyl phenyl ketone. A small sample of this blend was UV cured and then TGA analysis was conducted as described. The weight loss up to 300° C. was about 25.6 wt. % due to the thermal decomposition of the epoxy at this temperature. The char yield at 800° C. was about 10.3 wt. %.

Comparative Example 10—Photoreactive Organic Resins with Photostable Siloxane

A blend containing photoreactive organic resins and a photostable siloxane was prepared by mixing the following photoreactive organic resins: 6.5 g of 3,4-epoxycyclohexylmethyl 3,4-epoxycyclohexanecarboxylate, and 1.5 g 3-ethyl-3-oxetanemethanol (from TCI America, Portland, Oreg.); the following photoreactive siloxane: 2.0 g of SR355 silicone resin (in this particular embodiment, SR355 is considered photoreactive because the silanol groups can react with the epoxy groups in the photoreactive organic resins; however, SR355 is considered photostable in many other embodiments); and the following photoinitiators: 0.40 g (p-isopropylphenyl) (p-methylphenyl)iodonium tetrakis (pentafluorophenyl) borate (from Gelest, Inc.), and 0.10 g 4-benzoyl-4'methyl-diphenyl sulfide (from TCI America). A small sample of this blend was UV cured and then TGA analysis was conducted as described. The weight loss up to 300° C. was about 25.6% due to the fact the thermal decomposition of the epoxy had begun by this temperature. The char yield at 800° C. was about 12.6 wt. %.

Comparative Example 11—Photoreactive Organic Resins with Photoreactive Siloxane

A blend containing photoreactive organic resins and a photostable siloxane was prepared by mixing the following photoreactive organic resins: 6.5 g of 3,4-epoxycyclohexylmethyl 3,4-epoxycyclohexanecarboxylate, 1.5 g cyclohexanedimethanol divinyl ether; the following photoreactive organic resin: 2 g of methacrylated photoreactive siloxane B (described above); and the following photoinitiators: 0.4 g (p-isopropylphenyl) (p-methylphenyl)iodonium tetrakis (pentafluorophenyl) borate, 0.10 g 4-benzoyl-4'-methyl-diphenyl sulfide, and 0.15 g 1-hydroxycyclohexyl phenyl ketone. A small sample of this blend was UV cured and then TGA analysis was conducted as described. The weight loss up to 300° C. was about 26% due to the thermal decomposition of the epoxy at this temperature. The char yield at 800° C. was about 14 wt. %.

Examples 12-14. Pr-Ps Hybrid Binders that Include a Photoreactive Siloxane Component Example 12—Persistence of Photostable Siloxane Component A Pr-Ps hybrid binder was prepared by mixing, with gentle heating until solids were dissolved, the following photoreactive organic resins: 14 g CN963E80 urethane acrylate (from Sartomer USA LLC, Exton, Pa.), 59 g tricyclodecane dimethanol diacrylate; the following photoreactive siloxane: 15 g tetravinyltetramethyl cyclotetrasiloxane ($D_4^{Vi}$); the following photostable siloxane: 12 g of SR355 silicone resin; and the following photoinitiator and stabilizer: 2.0 g of phenylbis(2,4,6-trimethylbenzoyl) phosphine oxide, and 0.10 g t-butyl catechol.

This Pr-Ps hybrid binder was then used to prepare a photoreactive ceramic slurry containing the following: 37.08 g Pr-Ps hybrid binder solution, 0.90 g oleic acid, 0.10 g 2,4,7,9-tetramethyl-5-decyne-4,7-diol ethoxylate, 120.59 g alumina powder with a d50 of 10 and 40.17 g alumina powder with a d50 of 5 μm. After mixing with a spatula, the photoreactive ceramic slurry was further mixed on a SPEEDMIXER™ brand mixer at 2000 rpm for 15 seconds followed by three 1450 rpm mixes for one minute each. The photoreactive ceramic slurry was then coated in 7 layers on glass slides using a doctor blade and each layer was cured with an OMNICURE® 2000 UV light source for various times. The resulting samples (~0.028 inches thick) were removed from the glass slides. Approximately 1 cm² samples of each were placed in vials along with 4 mL aliquots of isopropanol (IPA). After capping the vials, they were placed in an ultrasonic cleaner for 35 minutes. The samples were then removed and wiped dry and then thermal gravimetric analysis (TGA) analysis was done to determine the weight loss of the sample up to 900° C. in air. Samples that we not cleaned with IPA were run as controls. The results are listed in Table 3.

TABLE 3

| Cure time per layer (seconds) | As Made TGA Weight Loss (%) | | After IPA Cleaning TGA Weight Loss (%) | |
|---|---|---|---|---|
| | 300° C. | 900° C. | 300° C. | 900° C. |
| 7 | 0.70 | 16.26 | 0.85 | 16.32 |
| 3 | 0.84 | 16.35 | 1.10 | 16.17 |
| 2 | 1.09 | 16.43 | 1.64 | 16.64 |
| 1 | 1.15 | 16.52 | 1.66 | 16.62 |

The weight loss values at 900° C. are similar for the as made and after cleaned samples indicating the SR355 silicone resin exhibited photostability and was not significantly extracted from the bars during cleaning. This result demonstrates that methyl phenyl silicone resins such as SR355 exhibit photostability or low reactivity in respect of polymerization reactions with photoreactive organic resins that include acrylate groups, for example, as opposed to epoxy groups. This result also demonstrates a photostable siloxane component exhibiting persistence in the Pr-Ps hybrid binder such that the photostable siloxane component would be available for conversation to silica during firing.

Example 13—Shrinkage for Photoreactive Ceramic Slurry Made from a Pr-Ps Hybrid Binder (Photoreactive Organic Resin and Photostable Siloxane with Photoreactive Siloxane)

A Pr-Ps hybrid binder solution was prepared by combining the following photoreactive organic resins: 10 g of CN963E80 urethane acrylate (from Sartomer USA LLC), 13.5 g pentaerythritol tetraacrylate, and 49.5 g tricyclodecane dimethanol diacrylate; the following photoreactive siloxane: 13.5 g tetravinyltetramethyl cyclotetrasiloxane ($D_4^{Vi}$); the following photostable siloxane: 13.5 g of SR355 silicone resin; and the following photoinitator and stabilizer: 0.02 g t-butyl catechol. The mixture was heated to –50° C. and stirred until homogeneous. At this point 2.0 g of phenylbis(2,4,6-trimethylbenzoyl) phosphine oxide was added as a stabilizer. Once the photoinitiator dissolved, the solution was cooled to room temperature.

A photoreactive ceramic slurry was then prepared using this Pr-Ps hybrid binder solution by combining the following: 36.99 g of the Pr-Ps hybrid binder solution, 1 mg of Sudan I, 0.61 g oleic acid, 0.50 g HYPERMER™ KD2 dispersant, 121.22 g alumina powder with a d50 of 10 μm, and 40.38 g alumina powder with a d50 of 5 μm. After mixing with a spatula, the slurry was further mixed on a SPEEDMIXER™ brand mixer at 2000 rpm for 15 seconds followed by three intervals of mixing at 1450 rpm for one minute each. Once cooled the slurry was used to print bars on a CERAFAB™ 7500 printer, available from Lithoz GmbH, Vienna, Austria, which had dimensions of about 1 inch long, about 0.4 inch wide, and about 0.05 inch thick. These bars were heated to 1600° C. to debind and sinter the components of the bars. The resulting linear shrinkage was measured to be 2.38%, showing good results relative to comparative examples 1-7.

Example 14—Shrinkage for Photoreactive Ceramic Slurry Made from a Pr-Ps Hybrid Binder (Photoreactive Organic Resin and Photostable Siloxane with Photoreactive Siloxane)

A Pr-Ps hybrid binder solution was prepared as above by combining the following photoreactive organic resins: 10 g of CN963E80 urethane acrylate (from Sartomer USA LLC), 13.5 g pentaerythritol tetraacrylate, 40.0 g tricyclodecane dimethanol diacrylate, and 9.5 g propoxylated (6) trimethylolpropane triacrylate; the following photoreactive siloxane: 13.5 g tetravinyltetramethyl cyclotetrasiloxane ($D_4^{Vi}$); the following photostable siloxane: 13.5 g of SR355 silicone resin; and the following photoinitiator and stabilizer: 0.02 g t-butyl catechol. The mixture was heated to ~50° C. and stirred until homogeneous. At this point 2.0 g of phenylbis(2,4,6-trimethylbenzoyl) phosphine oxide was added as a stabilizer.

A photoreactive ceramic slurry was prepared using the Pr-Ps hybrid binder from Example 14 by combining 1.6 mg Sudan I, 33.28 g binder solution, 0.65 g HYPERMER™ KD2, 0.55 g oleic acid, and 180.57 g alumina powder with a d50 of 7 μm. After mixing with a spatula, the slurry was further mixed on a SPEEDMIXER™ brand mixer at 2000 rpm for 15 seconds followed by three 1450 rpm mixes for one minute each. Once cooled the slurry was used to print bars on a CERAFAB™ 7500 printer, which had dimensions of about 1 inch long, about 0.4 inch wide, and about 0.05 inch thick. These bars were heated to 1600° C. to debind and sinter the components of the bars. The resulting linear shrinkage was measured to be 1.05%, showing good results relative to comparative examples 1-7.

Examples 15-17. Pr-Ps Hybrid Binders that do not Include a Photoreactive Siloxane Component Example 15—Pr-Ps Hybrid Binder: Photoreactive Organic Resin and Photostable Siloxane without Photoreactive Siloxane A control solution was prepared by mixing the following photoreactive organic resins: 4.5 g of trimethylolpropane propoxylate triacrylate, 1.0 g tricyclodecane dimethanol dimethacrylate, and 1.0 g ethylene glycol phenyl ether methacrylate; and the following photoinitiator: 0.16 g phenylbis(2,4,6-trimethylbenzoyl).

A Pr-Ps hybrid binder was prepared in the same manner as the photoreactive organic resin control solution in this example, but with the addition of the following photostable siloxane: HPM-502. Thus, the Pr-Ps hybrid binder solution included the following photoreactive organic resins: 4.5 g of trimethylolpropane propoxylate triacrylate, 1.0 g tricyclodecane dimethanol dimethacrylate, 1.0 g ethylene glycol phenyl ether methacrylate; the following photostable siloxane: 1.5 g HPM-502; and the following photoinitiator: and 0.16 g phenylbis(2,4,6-trimethylbenzoyl).

Approximately 1 g of the photoreactive organic resin control solution in this example, and approximately 1 g of the Pr-Ps hybrid binder solution in this example were respectively evenly spread over the bottom of a 2-inch diameter disposable aluminum pan and then exposed to UV light for 7 seconds at a distance of 6 inches using an OMNICURE® 2000 light source.

The resulting cured films were respectively broken up and placed in a respective vial along with 10 mL of chloroform. The resulting mixture was vigorously stirred for 2 hours after which time the solids were filtered out and washed with an additional 3 mL chloroform. Next, the solvent was stripped away using a rotary evaporator and the residue weight was determined. The residue weight for the photoreactive organic resin solution was 1.62% of the weight of the cured film, while the residue weight of the Pr-Ps hybrid binder solution was 19.8% of the weight of the cured film. This result indicates that the photostable siloxane (HPM-502), which made up about 18.4% of the binder solution) did not react with the acrylates during UV light exposure. This result demonstrates a photostable siloxane component exhibiting persistence in a Pr-Ps hybrid binder even without a photoreactive siloxane component such that the photostable siloxane component would be available for conversation to silica during firing.

Example 16—Pr-Ps Hybrid Binder: Photoreactive Organic Resin and Photostable Siloxanes without Photoreactive Siloxane A Pr-Ps hybrid binder was prepared by mixing the following photoreactive organic resins: 45 grams (g) of trimethylolpropane propoxylate triacrylate, 10 g tricyclodecane dimethanol dimethacrylate, and 10 g ethylene glycol phenyl ether methacrylate; the following photostable siloxanes: 20 g of SR355 silicone resin (methyl phenyl silicone resin), and 15 g HPM-502 (contains a silicon hydride group); and the following photoinitiator and stabilizer: 2.0 g phenylbis(2,4,6-trimethylbenzoyl) and 0.02 g t-butyl catechol. The mixture was heated to ~50° C. and stirred until homogeneous. At this point 2.0 g of phenylbis(2,4,6-trimethylbenzoyl) phosphine oxide was added as a stabilizer. Once the photoinitiator dissolved, the solution was cooled to room temperature.

A photoreactive ceramic slurry was prepared using this Pr-Ps hybrid binder by combining the following: 16.21 g of the Pr-Ps hybrid binder solution, 1.8 mg Sudan I, 0.72 g HYPERMER™ KD2 dispersant, and 83.06 g of alumina powder with a $d_{50}$ of 7 microns. After mixing with a spatula, the slurry was further mixed on a SPEEDMIXER™ brand mixer at 2000 rpm for 15 seconds followed by three intervals of mixing at 1450 rpm for one minute each.

Once cooled the photoreactive ceramic slurry was used to print bars on a CERAFAB™ 7500 printer, which had dimensions of about 2.5 inch long, about 0.5 inch wide, and about 0.067 inch thick. These bars were cleaned for 5 minutes in an ultrasonic bath using isopropanol as a solvent. The cleaned bars were heated to 1600° C. to debind and sinter the components of the bars. The resulting linear shrinkage was measured to be 1.04%, showing good results relative to comparative examples 1-7.

Example 17—Conversion of Photostable Siloxanes to Silica

Thermal gravimetric analysis (TGA) experiments were conducted on the photostable siloxane used in Examples 15 (HPM-502) and 16 (HPM-502 and SR355) using a Perkin Elmer TGA 7 instrument. These were done in air by heating from room temperature to 900° C. at a rate of 10° C./min. The char yield was determined to be 47.5 wt. % for the HPM-502 only and 59.4 wt. % for the combination of HPM-502 and SR355, indicating significant conversion of the photostable siloxane component to silica. Char yields of at least about 20 wt. % may be of interest for photostable siloxane components for use in Pr-Ps hybrid binders, including Pr-Ps hybrid binders that do not include a photoreactive siloxane component.

Technical effects of the present disclosure include photoreactive ceramic slurry formulations having Pr-Ps hybrid binders that improve the handling strength of the brown ceramic part. The disclosed Pr-Ps hybrid binder includes a photoreactive organic resin component and a photostable siloxane component, and optionally a photoreactive siloxane component. While the photoreactive organic resin component of the Pr-Ps hybrid binder decomposes and volatilizes during partial firing of a green ceramic part, at least a portion of the photostable siloxane component, and when present, the photoreactive siloxane component, convert to silica that is disposed about the ceramic particles (e.g., between, around the ceramic particles. The presence of silica may enhance the handling strength of the brown ceramic part relative to similar parts that do not contain silica. The amount of silica formed by the disclosed Pr-Ps hybrid binders is unexpectedly high, enabling char yields that can be greater than about 80% of the theoretical maximum char yield for a given siloxane component. Further, for ceramic parts made using alumina, exemplary embodiments enable reaction bonding between the photoreactive-binder generated silica and the alumina particles to form silicates (e.g., aluminosilicates) further increases the strength and reduces the shrinkage of the sintered ceramic part.

Further aspects of the invention are provided by the subject matter of the following clauses:

1. A ceramic slurry, comprising: ceramic particles; a photoreactive-photostable hybrid binder, comprising: a photoreactive organic resin component, a photoreactive siloxane component, and one or more photostable siloxane components; and a photoinitiator.

2. The ceramic slurry of any preceding clause, wherein the photoreactive organic resin component comprises an acrylate, a thiol, an epoxy, an oxetane, and/or a vinyl ether.

3. The ceramic slurry of any preceding clause, wherein the photoreactive siloxane component and the photoreactive organic resin component each homopolymerize to form interpenetrating polymer networks when cured.

4. The ceramic slurry of any preceding clause, wherein the photoreactive siloxane component comprises more than two functional groups that polymerize when cured.

5. The ceramic slurry of any preceding clause, wherein the one or more photostable siloxane components comprises a methyl phenyl silicone resin and/or one or more silicon hydride groups.

6. The ceramic slurry of any preceding clause, wherein the photoreactive organic resin component comprises an acrylate.

7. The ceramic slurry of any preceding clause, wherein the one or more photostable siloxane components comprises at least one photostable siloxane component that has terminal groups that include a silane group, a silanol group, a methyl group, an alkyl group, a phenyl group, and/or a polyether group.

8. The ceramic slurry of any preceding clause, wherein the one or more photostable siloxane components comprises: at least one photostable siloxane component that has terminal groups that include M units ($Me_3SiO$), D units ($Me_2SiO_2$), T units ($MeSiO_3$), and/or Q units ($SiO_4$); and/or at least one photostable siloxane component that has terminal groups that include modified M units ($RMe_2SiO$ or $R_1R_2MeSiO$), modified D units ($RMeSiO_2$ or $R_1R_2SiO_2$), and/or modified T units ($RSiO_3$).

9. The ceramic slurry of any preceding clause, wherein the one or more photostable siloxane components comprises a DT siloxane, an MQ siloxane, an MDQ siloxane, an MTQ siloxane, and/or a QDT siloxane.

10. The ceramic slurry of any preceding clause, wherein: the weight ratio of the photoreactive organic resin component to the sum of the photoreactive siloxane component and the one or more photostable siloxane components in the photoreactive-photostable hybrid binder is from about 2:1 to about 5:1; and/or the weight ratio of the photoreactive siloxane component to the one or more photostable siloxane components in the photoreactive-photostable hybrid binder is from about 1:5 to about 5:1.

11. The ceramic slurry of any preceding clause, wherein the ceramic particles that have a multimodal particle morphology and/or a multimodal size distribution.

12. A ceramic slurry, comprising: ceramic particles; a photoreactive-photostable hybrid binder, comprising: a photoreactive organic resin component, and one or more photostable siloxane components; and a photoinitiator; wherein the photostable siloxane component exhibits a char yield of at least 20 wt. %.

13. The ceramic slurry of any preceding clause, wherein the photoreactive organic resin component comprises an acrylate, a thiol, an epoxy, an oxetane, and/or a vinyl ether.

14. The ceramic slurry of any preceding clause, wherein the one or more photostable siloxane components comprises a methyl phenyl silicone resin and/or one or more silicon hydride groups.

15. The ceramic slurry of any preceding clause, wherein the photoreactive organic resin component comprises an acrylate.

16. The ceramic slurry of any preceding clause, wherein the one or more photostable siloxane components comprises at least one photostable siloxane component that has terminal groups that include a silane group, a silanol group, a methyl group, an alkyl group, a phenyl group, and/or a polyether group.

17. The ceramic slurry of any preceding clause, wherein the one or more photostable siloxane components comprises: at least one photostable siloxane component that has terminal groups that include M units ($Me_3SiO$), D units ($Me_2SiO_2$), T units ($MeSiO_3$), and/or Q units ($SiO_4$); and/or at least one photostable siloxane component that has terminal groups that include modified M units ($RMe_2SiO$ or $R_1R_2MeSiO$), modified D units ($RMeSiO_2$ or $R_1R_2SiO_2$), and/or modified T units ($RSiO_3$).

18. The ceramic slurry of any preceding clause, wherein the one or more photostable siloxane components comprises a DT siloxane, an MQ siloxane, an MDQ siloxane, an MTQ siloxane, and/or a QDT siloxane.

19. The ceramic slurry of any preceding clause, wherein the weight ratio of the photoreactive organic resin component to the sum of the one or more photostable siloxane components in the photoreactive-photostable hybrid binder is from about 2:1 to about 5:1.

20. The ceramic slurry of any preceding clause, wherein the ceramic particles that have a multimodal particle morphology and/or a multimodal size distribution.

21. The ceramic slurry of any preceding clause, wherein the ceramic particles comprise a first particle morphology that has a $d_{50}$ of from about 2 μm to about 10 μm, and a second particle morphology may have a $d_{50}$ in a range from about 8 μm to about 25 μm, such as about 8 μm to about 15 μm, such as about 15 μm to about 20 μm, or such as about 20 μm to about 25 μm, with the $d_{50}$ of the ceramic particles of the second particle morphology being larger than the $d_{50}$ of the ceramic particles of the first particle morphology.

22. A photoreactive-photostable hybrid binder, comprising a photoreactive organic resin component, and one or more photostable siloxane components; wherein the photostable siloxane component exhibits a char yield of at least 20 wt. %.

23. A photoreactive-photostable hybrid binder, comprising: a photoreactive organic resin component; a photoreactive siloxane component; and one or more photostable siloxane components.

24. The photoreactive-photostable hybrid binder of any preceding clause, wherein the photoreactive-photostable hybrid binder is included in the ceramic slurry of any preceding clause.

25. A method of forming a ceramic part, the method comprising: curing a portion of a ceramic slurry by exposing the portion of the ceramic slurry to light to form a green ceramic part; and partially firing the green ceramic part to form a brown ceramic part; wherein the ceramic slurry comprises: ceramic particles; a photoreactive-photostable hybrid binder, comprising: a photoreactive organic resin component, a photoreactive siloxane component, and one or more photostable siloxane components; and a photoinitiator.

26. The method of any preceding clause, wherein during curing, the photoreactive siloxane component and the photoreactive organic resin component independently cure and homopolymerize to form interpenetrating polymer networks.

27. The method of any preceding clause, wherein during curing, the photoreactive siloxane component and the one or more photostable siloxane components are miscible or soluble with the photoreactive organic resin component, and wherein the photoreactive siloxane component and the photoreactive organic resin component exclusively copolymerize.

28. The method of any preceding clause, comprising depositing a layer of the slurry onto a surface using a three-dimensional (3D) printer, wherein curing comprises selectively exposing the portion of the layer of the slurry to light using the 3D printer.

29. The method of any preceding clause, wherein partially firing comprises heating the green ceramic part to a temperature from about 500° C. to about 1200° C.; and wherein during partial firing, at least 20 wt. % of the photoreactive siloxane component and/or of the one or more photostable siloxane components are converted to silica disposed about the ceramic particles.

30. The method of any preceding clause, wherein partially firing comprises greater than about 70% of the siloxane units of the photoreactive siloxane component being converted to silica disposed about the ceramic particles.

31. The method of any preceding clause, comprising: sintering the brown ceramic part at or above a sintering temperature of the ceramic particles to form a ceramic part, wherein sintering comprising heating the brown ceramic part to a sufficient temperature to promote reaction bonding that converts silica from the photoreactive-photostable hybrid binder into silicates that bond with the ceramic particles.

32. The method of any preceding clause, wherein an average total shrinkage from partial firing and sintering of the ceramic part is less than about 4%.

33. A method of forming a ceramic part, the method comprising: curing a portion of a ceramic slurry by exposing the portion of the ceramic slurry to light to form a green ceramic part; and partially firing the green ceramic part to form a brown ceramic part; wherein the ceramic slurry comprises: ceramic particles; a photoreactive-photostable hybrid binder, comprising: a photoreactive organic resin component, and one or more photostable siloxane components; and a photoinitiator; and wherein the photostable siloxane component exhibits a char yield of at least 20 wt. %.

34. The method of any preceding clause, wherein during curing, the photoreactive organic resin component independently cures and polymerizes to form a polymer network and the one or more photostable siloxane components yield free silica disposed about the ceramic particles.

35. The method of any preceding clause, wherein the one or more photostable siloxane components comprises a methyl phenyl silicone resin and/or one or more silicon hydride groups.

36. The method of any preceding clause, wherein the photoreactive organic resin component comprises an acrylate.

37. The method of any preceding clause, wherein the one or more photostable siloxane components comprises at least one photostable siloxane component that has terminal groups that include a silane group, a silanol group, a methyl group, an alkyl group, a phenyl group, and/or a polyether group.

38. The method of any preceding clause, comprising depositing a layer of the slurry onto a surface using a three-dimensional (3D) printer, wherein curing comprises selectively exposing the portion of the layer of the slurry to light using the 3D printer.

39. The method of any preceding clause, wherein partially firing comprises heating the green ceramic part to a temperature from about 500° C. to about 1200° C.

40. The method of any preceding clause, comprising: sintering the brown ceramic part at or above a sintering temperature of the ceramic particles to form a ceramic part, wherein sintering comprising heating the brown ceramic part to a sufficient temperature to promote reaction bonding that converts silica from the photoreactive-photostable hybrid binder into silicates that bond with the ceramic particles.

41. The method of any preceding clause, wherein an average total shrinkage from partial firing and sintering of the ceramic part is less than about 4%.

42. The method of any preceding clause, wherein the method is performed using the ceramic slurry of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ceramic slurry, comprising:
   ceramic particles;
   a photoreactive-photostable hybrid binder, comprising:
     a photoreactive organic resin component, and
     one or more photostable siloxane components; and
   a photoinitiator,
   wherein the one or more photostable siloxane components exhibit a char yield of at least 20 wt. %.

2. The ceramic slurry of claim 1, wherein the photoreactive organic resin component comprises an acrylate, a thiol, an epoxy, an oxetane, and/or a vinyl ether.

3. The ceramic slurry of claim 1, wherein the one or more photostable siloxane components comprises a methyl phenyl silicone resin and/or one or more silicon hydride groups.

4. The ceramic slurry of claim 3, wherein the photoreactive organic resin component comprises an acrylate.

5. The ceramic slurry of claim 1, wherein the one or more photostable siloxane components comprises at least one photostable siloxane component that has terminal groups that include a silane group, a silanol group, a methyl group, an alkyl group, a phenyl group, and/or a polyether group.

6. The ceramic slurry of claim 1, wherein the one or more photostable siloxane components comprises:
   at least one photostable siloxane component that has terminal groups that include M units ($Me_3SiO$), D units ($Me_2SiO_2$), T units ($MeSiO_3$), and/or Q units ($SiO_4$); and/or
   at least one photostable siloxane component that has terminal groups that include modified M units ($RMe_2SiO$ or $R_1R_2MeSiO$), modified D units ($RMeSiO_2$ or $R_1R_2SiO_2$), and/or modified T units ($RSiO_3$).

7. The ceramic slurry of claim 1, wherein the one or more photostable siloxane components comprises a DT siloxane, an MQ siloxane, an MDQ siloxane, an MTQ siloxane, and/or a QDT siloxane.

8. The ceramic slurry of claim 1, wherein a weight ratio of the photoreactive organic resin component to a sum of the one or more photostable siloxane components in the photoreactive-photostable hybrid binder is from about 2:1 to about 5:1.

9. The ceramic slurry of claim 1, wherein the ceramic particles have a multimodal particle morphology and/or a multimodal size distribution.

10. The ceramic slurry of claim 1, wherein the ceramic particles comprise a first particle morphology that has a d50 of about 2 μm to about 10 μm, and a second particle morphology that has a d50 of about 8 μm to about 25 μm, with the d50 of the ceramic particles of the second particle morphology being larger than the d50 of the ceramic particles of the first particle morphology.

11. A photoreactive-photostable hybrid binder, comprising:
   a photoreactive organic resin component, and
   one or more photostable siloxane components;
   wherein the one or more photostable siloxane component exhibits a char yield of at least 20 wt. %.

12. A method of forming a ceramic part, the method comprising:
   curing a portion of a ceramic slurry by exposing the portion of the ceramic slurry to light to form a green ceramic part; and
   partially firing the green ceramic part to form a brown ceramic part;
   wherein the ceramic slurry comprises:
      ceramic particles;
      a photoreactive-photostable hybrid binder, comprising:
         a photoreactive organic resin component, and
         one or more photostable siloxane components; and
      a photoinitiator; and
   wherein the one or more photostable siloxane component exhibits a char yield of at least 20 wt. %.

13. The method of claim 12, wherein during curing, the photoreactive organic resin component independently cures and polymerizes to form a polymer network and the one or more photostable siloxane components yield free silica disposed about the ceramic particles.

14. The method of claim 12, wherein the one or more photostable siloxane components comprises a methyl phenyl silicone resin and/or one or more silicon hydride groups.

15. The method of claim 14, wherein the photoreactive organic resin component comprises an acrylate.

16. The method of claim 12, wherein the one or more photostable siloxane components comprises at least one photostable siloxane component that has terminal groups that include a silane group, a silanol group, a methyl group, an alkyl group, a phenyl group, and/or a polyether group.

17. The method of claim 12, comprising depositing a layer of the slurry onto a surface using a three-dimensional (3D) printer, wherein curing comprises selectively exposing the portion of the layer of the slurry to light using the 3D printer.

18. The method of claim 12, wherein partially firing comprises heating the green ceramic part to a temperature from about 500° C. to about 1200° C.

19. The method of claim 12, comprising:
   sintering the brown ceramic part at or above a sintering temperature of the ceramic particles to form a ceramic part, wherein sintering comprising heating the brown ceramic part to a sufficient temperature to promote reaction bonding that converts silica from the photoreactive-photostable hybrid binder into silicates that bond with the ceramic particles.

20. The method of claim 19, wherein an average total shrinkage from partial firing and sintering of the ceramic part is less than about 4%.

* * * * *